(12) United States Patent
Anchala et al.

(10) Patent No.: US 12,538,194 B2
(45) Date of Patent: Jan. 27, 2026

(54) ANTENNA IDENTIFICATION TOOL

(71) Applicant: DISH Wireless L.L.C., Englewood, CO (US)

(72) Inventors: Venkata Pavan Siddartha Aravind Anchala, Herndon, VA (US); Dilip Tandekar, Broadlands, VA (US); Gurpreet Sohi, Parker, CO (US); Sourabh Gupta, Ashburn, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 441 days.

(21) Appl. No.: 18/170,422

(22) Filed: Feb. 16, 2023

(65) Prior Publication Data

US 2024/0147323 A1 May 2, 2024

Related U.S. Application Data

(60) Provisional application No. 63/419,957, filed on Oct. 27, 2022.

(51) Int. Cl.
*H04W 24/04* (2009.01)
*H04W 36/00* (2009.01)

(52) U.S. Cl.
CPC ..... *H04W 36/00835* (2018.08); *H04W 24/04* (2013.01); *H04W 36/0094* (2013.01)

(58) Field of Classification Search
CPC ..... H04W 16/18; H04W 16/20; H04W 16/22; H04W 16/225; H04W 16/24;
(Continued)

(56) References Cited

U.S. PATENT DOCUMENTS 9,164,159 B2 10/2015 Nath et al.
9,781,685 B2 10/2017 Tsui et al.
(Continued)

FOREIGN PATENT DOCUMENTS

EP 3 869 847 A1 8/2021

OTHER PUBLICATIONS

"5G Network Evolution with AWS," Amazon Web Services, Inc., https://d1.awsstatic.com/whitepapers/5g-network-evolution-with-aws.pdf, Jul. 2020, 48 pages.
(Continued)

*Primary Examiner* — Matthew W Genack
(74) *Attorney, Agent, or Firm* — Seed Intellectual Property Law Group LLP

(57) ABSTRACT

Methods and apparatuses for identifying backup candidate cell sites for a primary cell site are described. A backup candidate cell site may comprise a cell site that is available to replace or support a primary cell site that serves a coverage area in the event that the primary cell site fails or experiences a significant reduction in signal transmission capability. The backup candidate cell sites may be identified based on a distance between a backup candidate cell site and the primary cell site, a minimum distance between the backup candidate cell site and one or more hosted sites that comprise sources of signal interference, and a buffer range between the antenna height for the primary cell site and the backup candidate cell site. Height conflicts occurring between cell site antennas and clutter within proximity of the antennas may be identified.

18 Claims, 15 Drawing Sheets

(58) Field of Classification Search
CPC ..... H04W 16/26; H04W 24/00; H04W 24/04; H04W 36/00835; H04W 36/0094; H04W 36/24; H04W 36/247; H04W 72/04; H04W 72/044; H04W 72/046

See application file for complete search history.

(56) References Cited

U.S. PATENT DOCUMENTS

| | | |
|---|---|---|
| 10,178,646 B2 | 1/2019 | Bosch et al. |
| 10,230,571 B2 | 3/2019 | Rangasamy et al. |
| 10,278,123 B2 | 4/2019 | Wang et al. |
| 10,452,372 B2 | 10/2019 | Lundberg et al. |
| 10,484,892 B2 | 11/2019 | Bellamkonda et al. |
| 10,499,276 B2 | 12/2019 | Chan et al. |
| 10,499,376 B2 | 12/2019 | Kim |
| 10,656,929 B2 | 5/2020 | Jamjoom et al. |
| 10,716,096 B2 | 7/2020 | Yu et al. |
| 10,812,377 B2 | 10/2020 | Stammers et al. |
| 10,886,976 B2 | 1/2021 | Rajagopal et al. |
| 10,904,038 B1 | 1/2021 | Haque |
| 10,944,668 B2 | 3/2021 | Rajagopal et al. |
| 10,986,540 B2 | 4/2021 | Bor Yaliniz et al. |
| 11,019,159 B2 | 5/2021 | Lawson et al. |
| 11,128,985 B2 | 9/2021 | Edge et al. |
| 11,153,271 B2 | 10/2021 | Yang et al. |
| 11,223,994 B2 | 1/2022 | Yang et al. |
| 11,228,621 B2 | 1/2022 | Sharma et al. |
| 11,240,063 B2 | 2/2022 | Liu et al. |
| 11,284,297 B2 | 3/2022 | Barton et al. |
| 2002/0170053 A1 | 11/2002 | Peterka et al. |
| 2015/0109976 A1 | 4/2015 | Zhang et al. |
| 2017/0079059 A1 | 3/2017 | Li et al. |
| 2018/0049015 A1 | 2/2018 | Gupta et al. |
| 2018/0307514 A1 | 10/2018 | Koutyrine et al. |
| 2019/0220703 A1 | 7/2019 | Prakash et al. |
| 2019/0253907 A1 | 8/2019 | Yao et al. |
| 2019/0289497 A1 | 9/2019 | Rajagopal |
| 2019/0306923 A1 | 10/2019 | Xiong et al. |
| 2019/0349429 A1 | 11/2019 | Jain et al. |
| 2020/0050494 A1 | 2/2020 | Bartfai-Walcott et al. |
| 2020/0106536 A1 | 4/2020 | Bedekar |
| 2020/0125389 A1 | 4/2020 | Palermo et al. |
| 2020/0195495 A1 | 6/2020 | Parker et al. |
| 2021/0014912 A1 | 1/2021 | Song et al. |
| 2021/0144517 A1 | 5/2021 | Guim Bernat et al. |
| 2021/0144613 A1 | 5/2021 | Colom Ikuno et al. |
| 2021/0194821 A1 | 6/2021 | Guim Bernat et al. |
| 2021/0204162 A1 | 7/2021 | Chunduri et al. |
| 2021/0242893 A1 | 8/2021 | Goodman et al. |
| 2021/0258231 A1 | 8/2021 | Venkataramu et al. |
| 2021/0258836 A1 | 8/2021 | Faccin et al. |
| 2021/0306874 A1 | 9/2021 | Bedekar |
| 2021/0314842 A1 | 10/2021 | Padlikar et al. |
| 2021/0377116 A1 | 12/2021 | Yeh et al. |
| 2021/0385666 A1* | 12/2021 | Ramiro Moreno ... H04W 16/18 |
| 2022/0035650 A1 | 2/2022 | Banerjee et al. |
| 2022/0070734 A1 | 3/2022 | Rajagopal |
| 2022/0329290 A1* | 10/2022 | Brown ................. H04B 7/0617 |

OTHER PUBLICATIONS

"Deploying E2E 5G Network with AWS," Amazon Web Services, Inc., https://d1.awsstatic.com/architecture-diagrams/ArchitectureDiagrams/5g-with-aws-ra.pdf?did=wp_card&trk=wp_card, 2020, 1 page.

"Promoting the Deployment of 5G Open Radio Access Networks," 5G Americas, Nov. 2020, 60 pages.

"Continuous Integration and Continuous Delivery for 5G Networks on AWS," Amazon Web Services, Inc., https://docs.aws.amazon.com/whitepapers/latest/cicd_for_5g_networks_on_aws/cicd_for_5g_networks_on_aws.html, Mar. 8, 2021, 31 pages.

"Cloud Automation for 5G Network," Amazon Web Services, Inc., https://d1.awsstatic.com/whitepapers/cloud-automation-for-5g-network.pdf, Jun. 16, 2021, 22 pages.

Bye et al., "Reinventing cloud-native 5G networks," Amazon Web Services, Inc., https://www.fcc.gov/file/21588/download, 2021, 11 pages.

"Next-Generation Mobile Private Networks Powered by AWS," Amazon Web Services, Inc., https://docs.aws.amazon.com/whitepapers/latest/mobile-private-networks/mobile-private-network-components.html, Jan. 27, 2021, 29 pages.

"DISH lays the foundation for 5G network security," Dish Wireless, https://mma.prnewswire.com/media/1483423/Security_Whitepaper_CLEAN.pdf?p=original, Apr. 8, 2021, 12 pages.

"Future of the Connected Vehicle," Dish Wireless, https://www.dishwireless.com/content/dam/pdfs/wi-whitepaper-connectedcar.pdf, Jan. 6, 2022, 22 pages.

Maule et al., "Real-time Dynamic Network Slicing for the 5G Radio Access Network," Iquadrat Informatica S.L., https://ieeexplore.ieee.org/document/9013965, Dec. 9-13, 2019, 6 pages.

"Amazon EC2 Overview and Networking Introduction for Telecom Companies," Amazon Web Services, Inc., https://d1.awsstatic.com/whitepapers/amazon-ec2-networking-for-telecom.pdf, Sep. 2019, 27 pages.

* cited by examiner

ANTENNA IDENTIFICATION TOOL

BACKGROUND

Next generation mobile networks have the promise to provide higher throughput, lower latency, and higher availability compared with previous wireless communication standards. For fifth generation (5 G) mobile networks, a combination of control and user plane separation (CUPS) and multi-access edge computing (MEC), which allows compute and storage resources to be moved from a centralized cloud location to the "edge" of a network and closer to end user devices and equipment, has enabled low-latency applications with millisecond response times. 5 G networks may leverage the use of cyclic prefix orthogonal frequency-division multiplexing (CP-OFDM) to increase channel utilization and reduce interference, the use of multiple-input multiple-output (MIMO) antennas to increase spectral efficiency, and the use of millimeter wave spectrum (mmWave) operation to increase throughput and reduce latency in data transmission. 5 G wireless user equipment (UE) may communicate over both a lower frequency sub-6 GHz band between 410 MHz and 7125 MHz and a higher frequency mmWave band between 24.25 GHz and 52.6 GHz. In general, although lower frequencies may provide a lower maximum bandwidth and lower data rates than higher frequencies, lower frequencies may provide higher spectral efficiency and greater range. Thus, there is a tradeoff between coverage and speed. For example, although the mmWave spectrum may provide higher data rates, the millimeter waves may not penetrate through objects, such as walls, and may have a more limited range.

BRIEF SUMMARY

Systems and methods for identifying backup candidate cell sites for a primary cell site and for detecting height conflicts between cell site antennas and environmental clutter are provided. The environmental clutter may comprise trees and buildings that block or degrade the transmission of wireless signals. A backup candidate cell site may be identified from a plurality of backup candidate cell sites based on a distance between the backup candidate cell site and the primary cell site, a minimum distance between the backup candidate cell site and one or more hosted sites, and a height of the backup candidate cell site relative to a height of the primary cell site. Height conflicts occurring between antennas of cell sites and environmental clutter within coverage areas of the cell sites may be detected in order to eliminate hosted sites as sources of inference and/or to remove backup candidate cell sites from consideration as backup candidate cell sites. In some cases, a growth rate of the environmental clutter may be used to estimate a future elevation of the environmental clutter and to determine whether the future elevation of the environmental clutter will become greater than an antenna elevation for a backup candidate cell site.

According to some embodiments, the technical benefits of the systems and methods disclosed herein include improved system performance and a reduction in time to identify backup candidate cell sites and to detect height conflicts between cell site antennas and environmental clutter.

BRIEF DESCRIPTION OF THE DRAWINGS

Like-numbered elements may refer to common components in the different figures.

DETAILED DESCRIPTION

Figure 1:
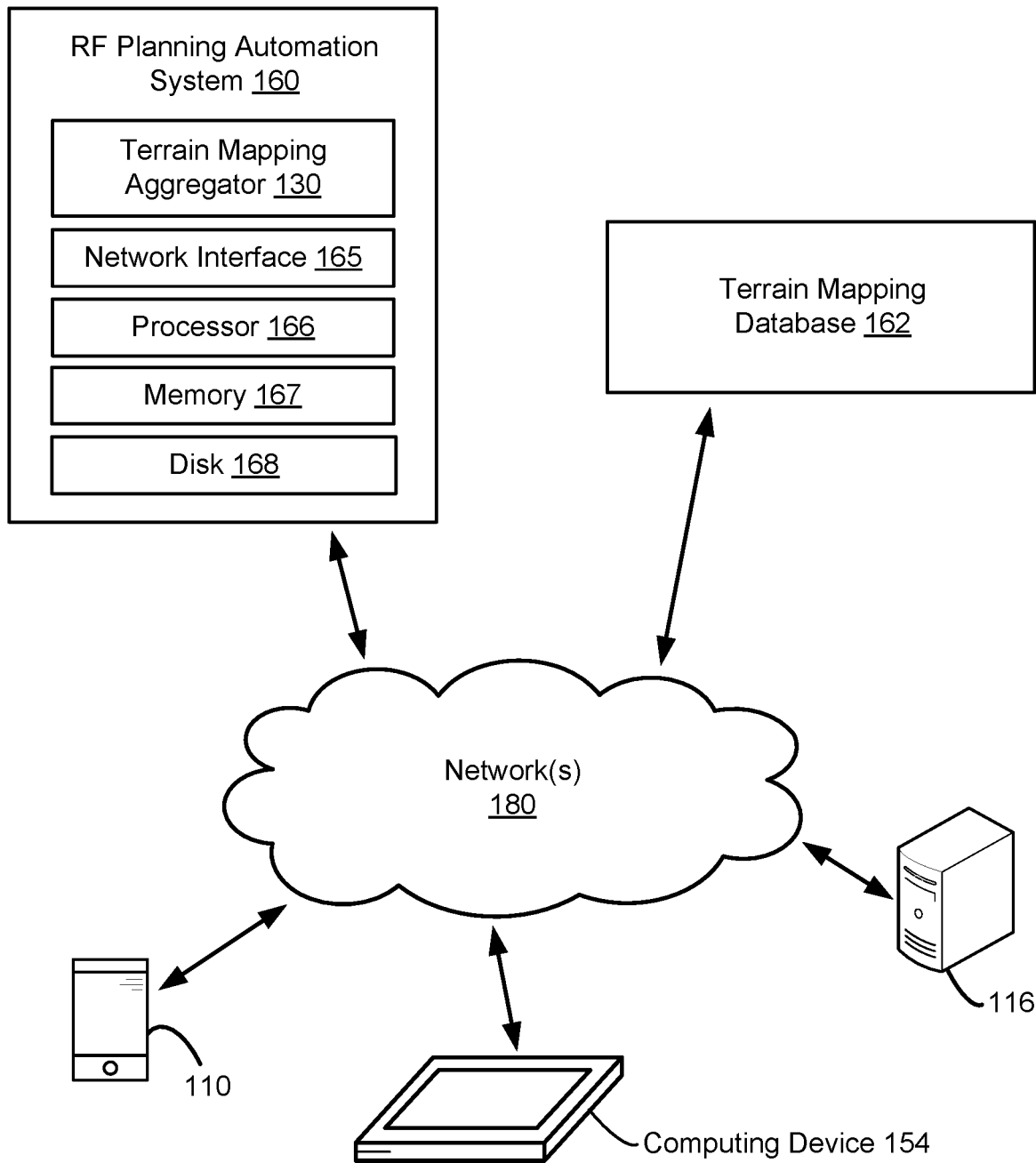
FIG. 1 depicts one embodiment of a networked computing environment in which the disclosed technology may be practiced.

Technology is described for automating the process of identifying backup candidate cell sites for a primary cell site and detecting height conflicts between cell site antennas and environmental clutter. A backup candidate cell site (or backup site) may comprise a cell site that is available to be used in the event that a primary cell site serving a coverage area (or service area) fails or experiences a significant reduction in signal transmission capability. The backup site may comprise one or more macrocells (e.g., capable of reaching 18 miles) or small cells, such as microcells (e.g., capable of reaching 1.2 miles), picocells (e.g., capable of reaching 0.12 miles), and femtocells (e.g., capable of reaching 32 feet). The backup candidate cell site may be identified based on a distance between the backup candidate cell site and the primary cell site (e.g., a smaller distance between the backup candidate cell site and the primary cell site may be preferable), a minimum distance between the backup candidate cell site and one or more hosted sites (e.g., to mitigate interference, the backup candidate cell site should be at least a threshold distance away from each of the hosted sites), and a buffer range of the antenna height for the primary cell site (e.g., the height of the backup candidate cell site should be within a threshold height of the height of the primary cell site). Height conflicts occurring between cell site antennas of cell sites and environmental clutter (or physical structures) close to the antennas that act as wireless signal obstructions may be detected in order to generate alerts to network operators, to remove hosted sites that have height conflicts as sources of inference, and/or to remove backup candidate cell sites that have height conflicts as possible backup candidate cell sites. The environmental clutter (or clutter) may comprise buildings, houses, monuments, towers, trees, and vegetation that block, degrade, or attenuate wireless signals.

One technical issue with planning the deployment of next-generation mobile networks is that higher frequency signal transmissions are more line-of-sight dependent, have a more limited range, and are more susceptible to signal degradation due to clutter within an environment. Moreover, clutter density and clutter heights associated with vegetation may vary over time due to seasonality and vegetative growth. As the use of smaller cell coverage areas increases along with higher radio frequencies, the ability to automatically identify signal-obstructing clutter and to incorporate the height and locations of the identified clutter when determining backup candidate cell sites for a primary cell site will become necessary to meet network performance and reliability metrics. Technical benefits of automating the ranking and identification of backup candidate cell sites and automating the detection of height conflicts between cell site antennas and environmental clutter include reducing the time to locate and acquire backup candidate cell sites, reducing the time to fix antenna height conflicts, and improving wireless network availability and reliability.

Clutter height data may assign a height value to an area of clutter. For example, a clutter area comprising a 10 m by 10 m area of a forest may be assigned a clutter height value of 20 m (e.g., 20 meters above mean sea level). The clutter height value may be specified relative to a ground height or correspond with a height above mean sea level. Each clutter area may correspond with a clutter density value. For example, a clutter area comprising a 10 m by 10 m area of a dense forest may be assigned a density value of 0.8 specifying that 80% of the area acts to block or significantly degrade the transmission of wireless signals.

A region may be partitioned into bins comprising square clutter areas (e.g., the region may be partitioned into a number of 10 m by 10 m areas). In one example, an urban region with a clutter density above a threshold may be partitioned into a grid of 10 m by 10 m squares and each of the squares may be assigned a clutter height corresponding with the maximum clutter height for the square. In another example, a rural region with a clutter density below a threshold may be partitioned into bins corresponding with 50 m by 50 m squares and each of the bins may be assigned a clutter height corresponding with the average clutter height for the square.

In some cases, if the density value corresponding with a clutter area is greater than a threshold (e.g., greater than 0.7), then the clutter height value assigned to the clutter area may comprise the maximum clutter height within the clutter area. If the density value corresponding with a clutter area is less than a threshold (e.g., less than 0.3), then the clutter height value assigned to the clutter area may comprise the average clutter height within the clutter area. If the density value corresponding with a clutter area is between a lower threshold and an upper threshold (e.g., between 0.3 and 0.7), then the clutter height value assigned to the clutter area may comprise a weighted average of the clutter heights within the clutter area. Moreover, a clutter density value greater than a threshold may cause a clutter area to be partitioned into smaller subareas that are individually treated as clutter areas with their own clutter density values and clutter heights.

In some embodiments, each clutter area may correspond with two clutter heights, a first clutter height corresponding with hard signal blocking features such as hills and buildings and a second clutter height corresponding with softer signal blocking features such as sparse vegetation of a density that may degrade signal transmissions but not completely block the signal transmissions. In other embodiments, each clutter area may correspond with two clutter heights, a first clutter height corresponding with clutter of a first density (e.g., the clutter density at the first clutter height is greater than 50%) and a second clutter height corresponding with clutter of a second density less than the first density (e.g., the clutter density at the second clutter height is less than 50%). A lower clutter density may correspond with less signal degradation due to clutter compared with a higher clutter density.

In some embodiments, as vegetation may grow over time and have different growth rates, each clutter area may correspond with a growth vector specifying a rate of growth for the clutter height. For example, a growth vector of 1.1 may correspond with an estimated per year growth rate in the clutter height of 1.1× or a 10% growth rate. The identification of backup candidate cell sites for a primary cell site may take the growth vector into consideration when selecting backup candidate cell sites by increasing the clutter heights for clutter areas based on the growth vector (e.g., extrapolating out five years of growth or until the end of life of the primary cell site).

In some embodiments, one or more backup candidate cell sites for a primary cell site may be identified by acquiring a terrain elevation map of a region in which the primary cell site operates, determining a primary site elevation for the primary cell site using terrain elevation information from the terrain elevation map, identifying a set of hosted site elevations for a set of hosted sites that comprise sources of signal interference, identifying a plurality of backup candidate site elevations for a plurality of backup candidate sites, determining a plurality of coverage overlap areas for each of the plurality of backup candidate sites, determining a set of height conflicts for the plurality of backup candidate sites and the set of hosted sites, removing at least a subset of the plurality of backup candidate sites based on the set of height conflicts, removing at least a subset of the set of hosted sites based on the set of height conflicts, and ranking and outputting the one or more backup candidate sites of the plurality of backup candidate sites that are within at least a first distance of the primary site location, that are at least a second distance away from each of the set of hosted site locations, that are within a buffer height of the primary site elevation, and/or that have at least a threshold coverage overlap area with a coverage area of the primary cell site.

FIG. 1 depicts one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile smartphone 110, hardware server 116, computing device 154, terrain mapping database 162, and RF planning automation system 160. In some embodiments, the plurality of computing devices may include other computing devices not shown. In some embodiments, the plurality of computing devices may include more than or less than the number of computing devices depicted in FIG. 1. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks. Each network of the one or more networks 180 may include hubs, bridges, routers, switches, and wired transmission media such as a wired network or direct-wired connection.

In some embodiments, computing devices within the networked computing environment 100 may comprise real hardware computing devices or virtual computing devices, such as one or more virtual machines. Networked storage devices within the networked computing environment 100 may comprise real hardware storage devices or virtual storage devices, such as one or more virtual disks. The real hardware storage devices may include non-volatile and volatile storage devices. Virtualization allows virtual hardware to be created and decoupled from the underlying physical hardware. One example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

Networked computing environment 100 may provide a cloud computing environment for one or more computing devices. Cloud computing may refer to Internet-based computing, wherein shared resources, software, and/or information are provided to the one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The RF planning automation system 160 may automatically identify backup candidate cell sites for a primary cell site and detect height conflicts occurring between cell site antennas and environmental clutter. In some cases, the detection of height conflicts may be used by the RF planning automation system 160 to remove cell sites with height conflicts from consideration as potential backup candidate cell sites and/or to remove hosted sites with height conflicts from consideration as potential sources of interference during identification and selection of a ranked list of backup candidate cell sites.

One embodiment of the RF planning automation system 160 includes a network interface 165, processor 166, memory 167, and disk 168 all in communication with each other. Network interface 165 allows the RF planning automation system 160 to connect to the one or more networks 180. Network interface 165 may include a wireless network interface and/or a wired network interface. Processor 166 allows the RF planning automation system 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, or Flash). Memory 167 may comprise a hardware storage device or a semiconductor memory. The RF planning automation system 160 also includes a terrain mapping aggregator 130 that may acquire one or more terrain elevation maps from a database, such as the terrain mapping database 162. The one or more terrain elevation maps may include terrain elevation data for a region (e.g., a city or urban environment). The terrain mapping aggregator 130 may detect elevation discrepancies for a particular coordinate location within the region and determine an assigned elevation for the particular coordinate location based on an average elevation value or a maximum elevation value. The determination of whether to assign an average elevation value or a maximum elevation value for the particular coordinate location may depend on a clutter density at the particular coordinate location. For example, if the clutter density exceeds a threshold density (e.g., is greater than 70%), then a maximum elevation value may be assigned to the particular coordinate location instead of an average elevation value.

The RF planning automation system 160 may communicate with the server 116 to offload various processing tasks. In some cases, the server 116 may comprise a server within a data center. The data center may include one or more servers, such as server 116, in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client. In some cases, the server 116 may comprise part of a cloud-based compute and storage infrastructure that provides a cloud computing environment.

Figure 2A:
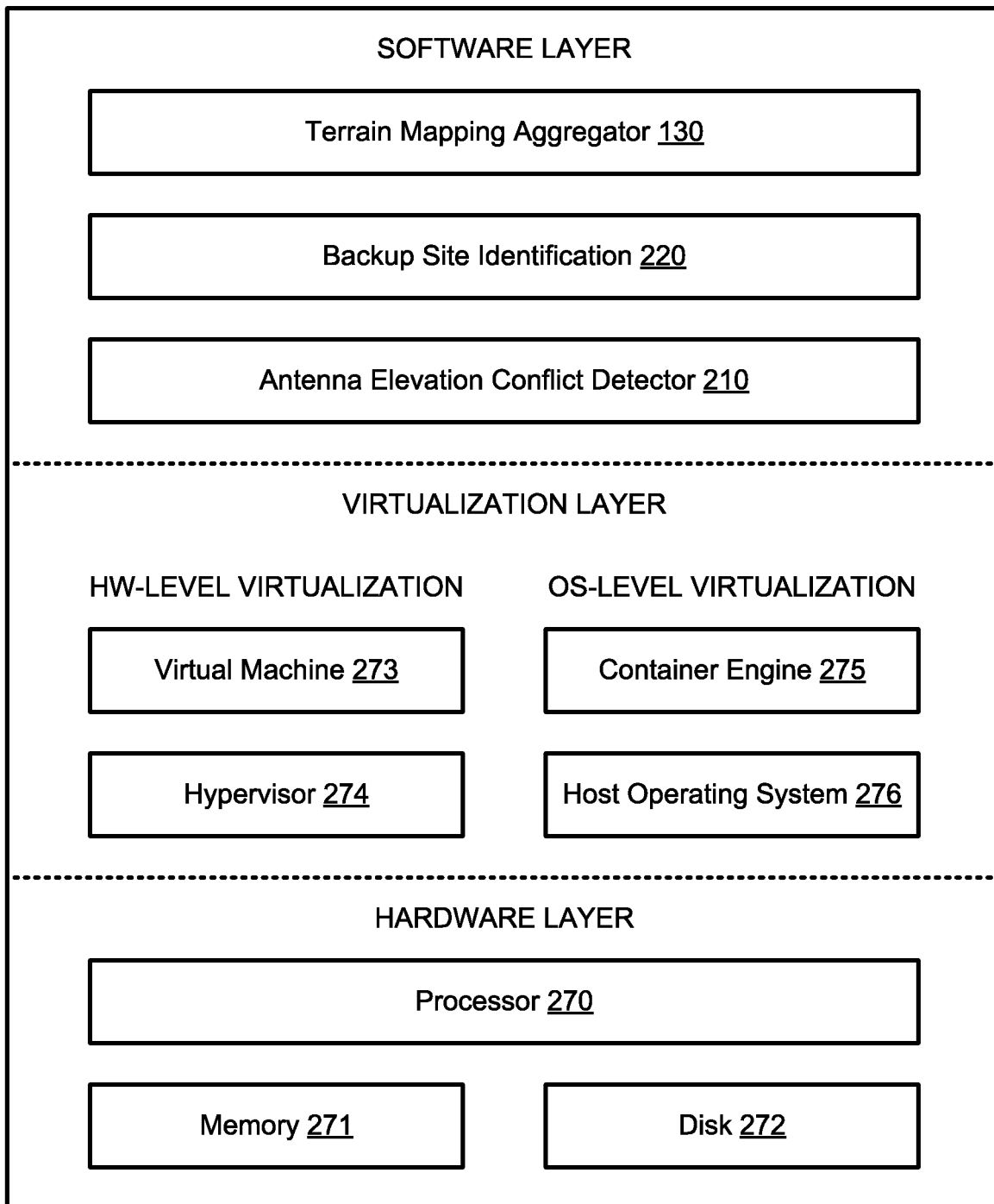
FIG. 2A depicts one embodiment of an RF planning automation system.

FIG. 2A depicts one embodiment of an RF planning automation system 160. As depicted, the RF planning automation system 160 includes hardware-level components and software-level components. The hardware-level components include one or more processors 270, one or more memory 271, and one or more disks 272. The software-level components include software applications, such as the terrain mapping aggregator 130, backup site identification 220, and the antenna elevation conflict detector 210. The software-level components may be run using the hardware-level components or executed using processor and storage components of the hardware-level components. For example, one or more of the software-level components may be executed or run using the processor 270, memory 271, and disk 272. In another example, one or more of the software-level components may be executed or run using a virtual processor and a virtual memory that are themselves executed or generated using the processor 270, memory 271, and disk 272.

The terrain mapping aggregator 130 may acquire one or more terrain elevation maps from one or more databases, such as the terrain mapping database 162 in FIG. 1, and generate a terrain elevation map using terrain elevation data from the acquired terrain elevation maps. The backup site identification 220 may identify one or more backup candidate cell sites for a primary cell site by ranking a list of backup candidate cell sites based on various criteria including the distance between the backup candidate cell sites and the primary cell site and the distance between the backup candidate cell sites to hosted cell sites that may interfere with signals transmitted from the backup candidate cell sites. The antenna elevation conflict detector 210 may detect discrepancies between the heights of cell site antennas and clutter heights corresponding with clutter adjacent to the cell site antennas. In one example, if the clutter height for a particular coordinate location within a region is greater than the height of a cell site antenna at the particular coordinate location, then an alert may be generated and outputted (e.g., transmitted or displayed) identifying that the height of the cell site antenna at the particular coordinate location is lower than the clutter height at the particular coordinate location. In another example, if the clutter height of clutter within a radial distance of a particular coordinate location corresponding with a cell site is greater than an antenna height of the cell site (e.g., clutter height within 30 meters of the cell site location is greater than the antenna height of the cell site), then an alert may be generated and outputted (e.g., transmitted or displayed) identifying that the height of the cell site antenna at the particular coordinate location is lower than the clutter height within the radial distance of the particular coordinate location.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the backup site identification 220 and the antenna elevation conflict detector 210. The virtual machine 273 may run the host operation system 276 upon which the container engine 275 may run. A virtual machine, such as virtual machine 273, may include one or more virtual processors.

A container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container may comprise the unit of replication. Other computing platforms may wrap one or more containers into a pod and therefore a pod may comprise the unit of replication.

A replication controller may be used to ensure that a specified number of replicas of a pod are running at the same time. If less than the specified number of pods are running (e.g., due to a node failure or pod termination), then the replication controller may automatically replace a failed pod with a new pod. In some cases, the number of replicas may be dynamically adjusted based on a prior number of node failures. For example, if it is detected that a prior number of node failures for nodes in a cluster running a particular network slice has exceeded a threshold number of node failures, then the specified number of replicas may be increased (e.g., increased by one). Running multiple pod instances and keeping the specified number of replicas constant may prevent users from losing access to their application in the event that a particular pod fails or becomes inaccessible.

In some embodiments, a virtualized infrastructure manager not depicted may be used to provide a centralized platform for managing a virtualized infrastructure for deploying various components of the RF planning automation system 160. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

Figure 2B:
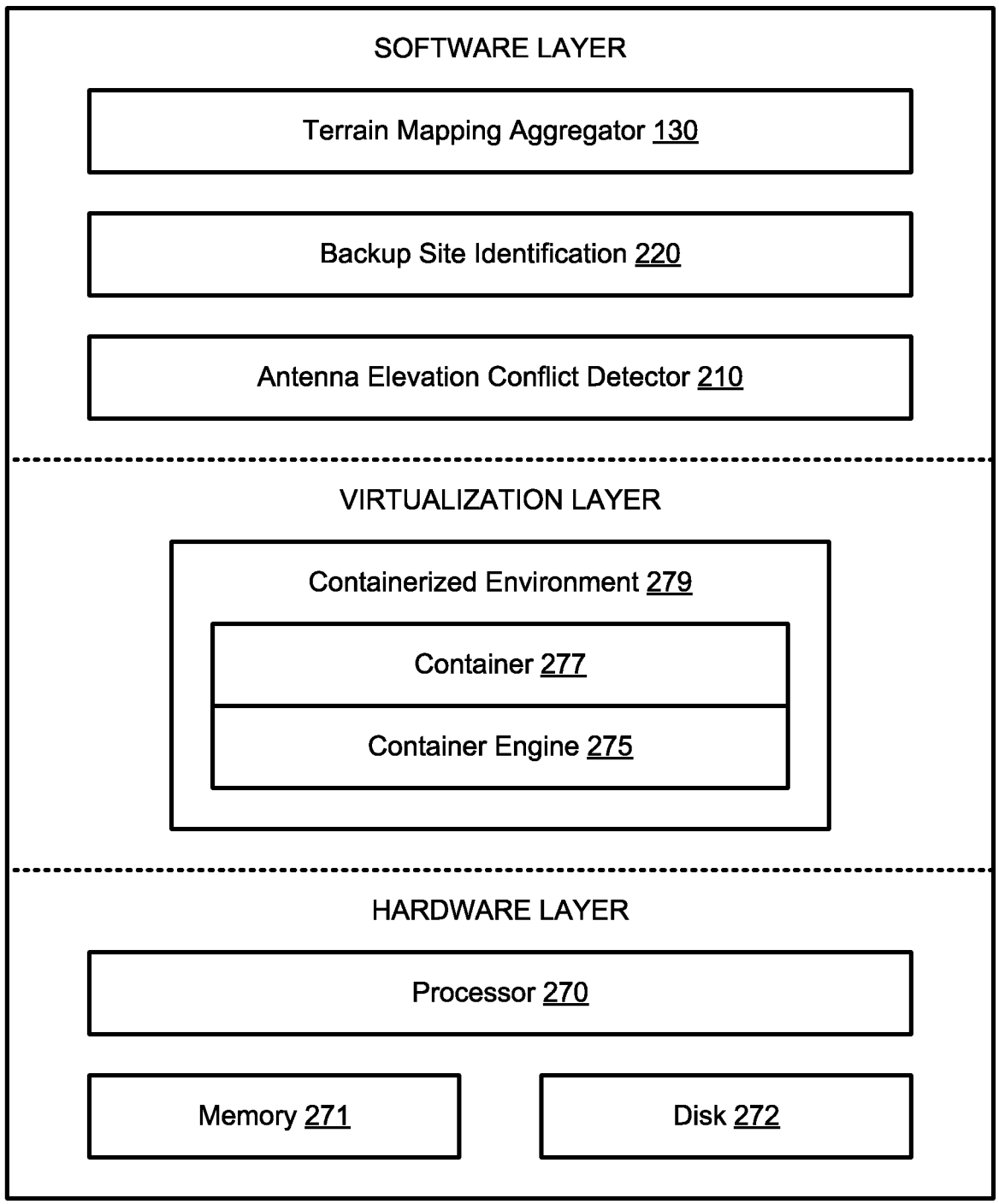
FIG. 2B depicts another embodiment of an RF planning automation system.

FIG. 2B depicts an embodiment of the RF planning automation system 160 of FIG. 2A in which the virtualization layer includes a containerized environment 279. The containerized environment 279 includes a container engine 275 for instantiating and managing application containers, such as container 277. Containerized applications may comprise applications that run in isolated runtime environments (or containers). The containerized environment 279 may include a container orchestration service for automating the deployments of containerized applications. The container 277 may be used to deploy various microservices corresponding with processes executed by the RF planning automation system 160. The containerized environment 279 may be executed using hardware-level components or executed using processor and storage components of the hardware-level components. In one example, the containerized environment 279 may be run using the processor 270, memory 271, and disk 272. In another example, the containerized environment 279 may be run using a virtual processor and a virtual memory that are themselves executed or generated using the processor 270, memory 271, and disk 272.

Figure 2C:
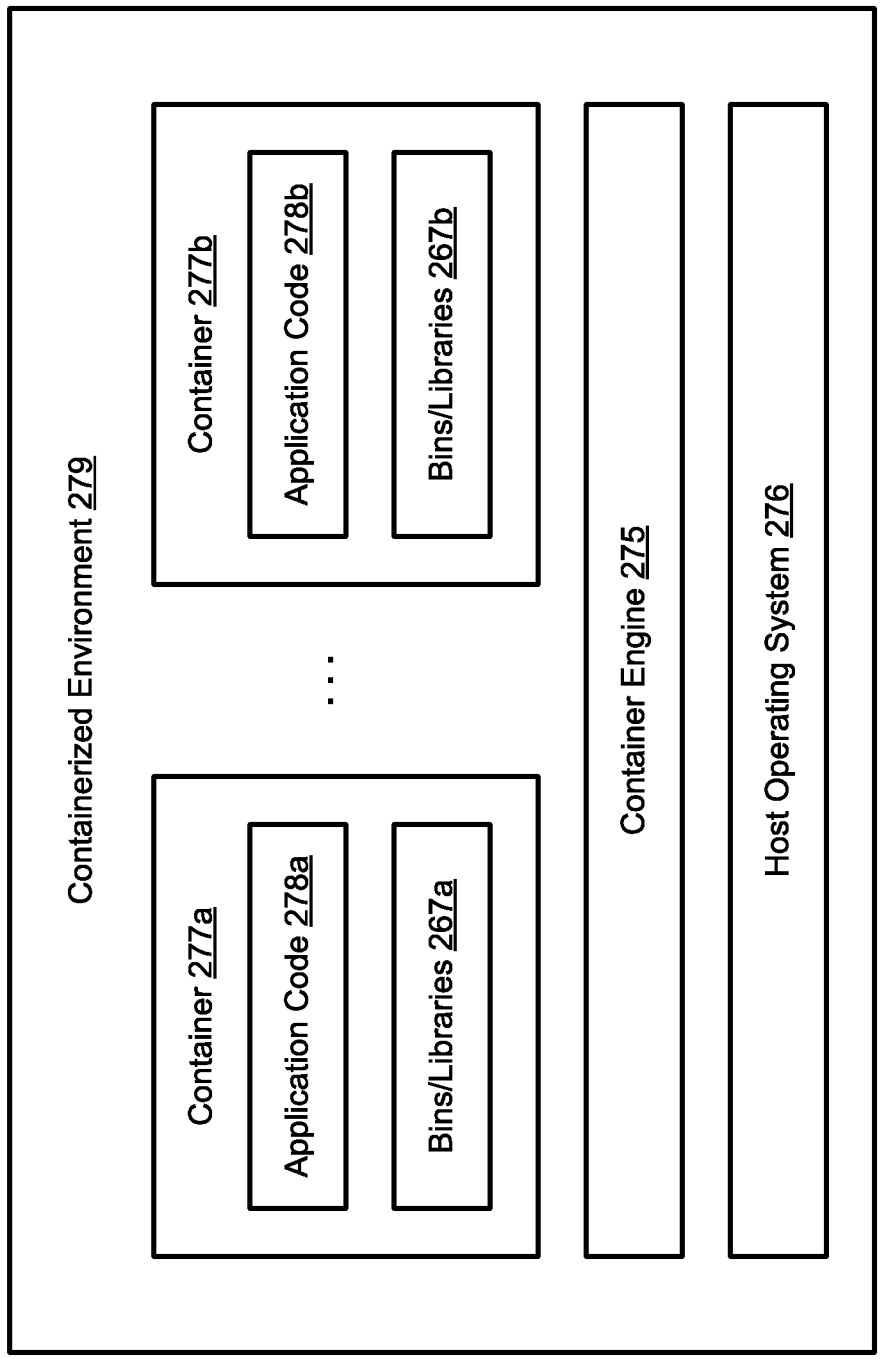
FIG. 2C depicts an embodiment of a containerized environment that includes a container engine running on top of a host operating system.

FIG. 2C depicts an embodiment of a containerized environment 279 that includes a container engine 275 running on top of a host operating system 276. The container engine 275 may manage or run containers 277*a* and 277*b* on the same operating system kernel of the host operating system 276.

The container engine 275 may acquire a container image and convert the container image into one or more running processes. In some cases, the container engine 275 may group containers that make up an application into logical units (or pods). A pod may contain one or more containers and all containers in a pod may run on the same node in a cluster. Each container 277 may include application code 278 and application dependencies 267, such as operating system libraries, required to run the application code 278. As depicted, container 277a includes application code 278a and application dependencies 267a and container 277b includes application code 278b and application dependencies 267b. Containers allow portability by encapsulating an application within a single executable package of software that bundles application code 278 together with the related configuration files, binaries, libraries, and dependencies required to run the application code 278. In one embodiment, applications of the RF planning automation system 160 may be executed using the containerized environment 279.

Figure 3A:
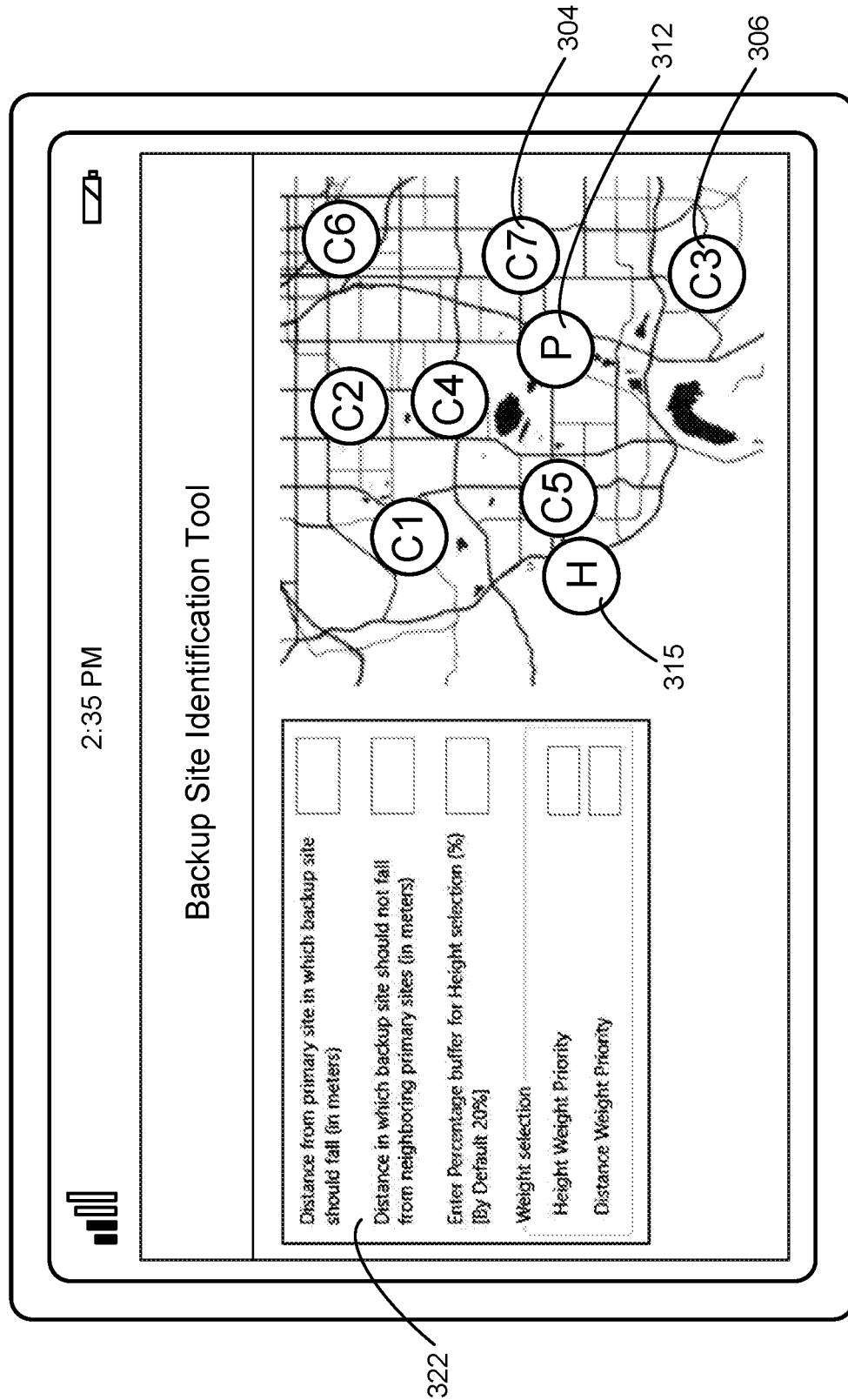
FIG. 3A depicts one embodiment of a mobile device providing a user interface for interacting with an RF planning automation system to identify and display a ranking of backup candidate cell sites for a given primary cell site.

FIG. 3A depicts one embodiment of a mobile device 302 providing a user interface for interacting with the RF planning automation system 160 to identify and display a ranking of backup candidate cell sites for a given primary cell site. In one example, the mobile device 302 may correspond with the computing device 154 in FIG. 1. The mobile device 302 may include a touchscreen display that displays a user interface to an end user of the mobile device 302. The mobile device 302 may display device status information regarding wireless signal strength, time, and battery life associated with the mobile device, as well as the user interface for controlling or interacting with the RF planning automation system 160. The user interface may be provided via a web-browser or an application running on the mobile device. The user interface may include one or more input fields 322 for submitting one or more input parameters to the RF planning automation system 160. The one or more input parameters may include a maximum distance from a primary cell site that a backup site should fall (e.g., the backup site should be located within the maximum distance to the primary cell site), a minimum distance that a backup site should be from neighboring primary sites and/or hosted cell sites that may cause signal interference with wireless transmissions from the backup site, and a percentage buffer height between a height of the primary cell site and a height of the backup site (e.g., the height of the backup site should be within 10% of the height of the primary cell site or within 3 meters of the height of the primary cell site). The one or more input parameters may also include weighting factors for weighing the distance restrictions (e.g., the distance from the primary cell site to the backup site) with the buffer height restrictions.

As depicted in FIG. 3A, identifications of cell site locations have been overlaid with a map of a region. The cell site locations may correspond with locations of a primary cell site 312, a hosted cell site 315 (e.g., comprising another primary cell site or an operational cell site that is transmitting wireless signals), and backup candidate cell sites C1 though C7. From the map, the backup candidate cell site C7 304 comprises the backup candidate cell site that is closest to the primary cell site 312 and the backup candidate cell site C3 306 comprises the southernmost backup candidate cell site.

Figure 3B:
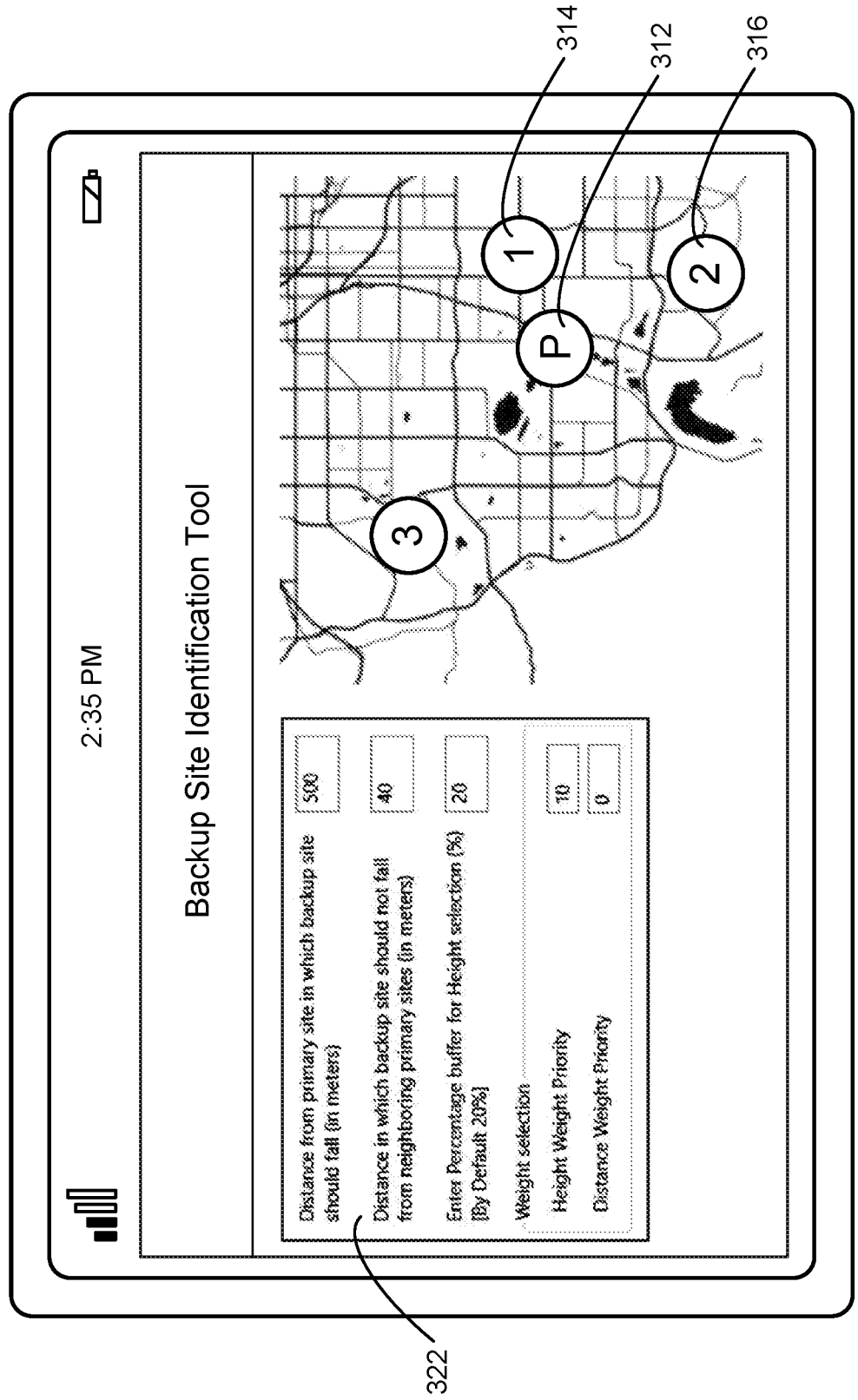
FIG. 3B depicts an embodiment of a mobile device in which one or more input parameters have been submitted via a user interface.

FIG. 3B depicts an embodiment of the mobile device 302 in which one or more input parameters have been submitted via the user interface depicted in FIG. 3A. As depicted, the distance from the primary cell site in which the backup site should fall has been specified as at most 500 meters, the distance in which a backup site should not fall from neighboring primary sites (or hosted sites) has been specified as at least 40 meters, and the percentage buffer height between a height of the primary cell site and a height of the backup site has been specified as within 20% of the height of the primary cell site. In response to the submitted input parameters, the top three backup candidate cell sites have been identified including the highest ranked backup candidate cell site 314 that corresponds with the backup candidate cell site C7 304 in FIG. 3A and the second highest ranked backup candidate cell site 316 that corresponds with the backup candidate cell site C3 306 in FIG. 3A. Both the highest ranked backup candidate cell site 314 and the second highest ranked backup candidate cell site 316 have antenna heights that are within 20% of the height of the primary cell site 312, are within 500 meters of the location of the primary cell site, and are at least 40 meters away from other primary cell sites (or hosted sites) such as the hosted cell site 315 in FIG. 3A.

Figure 3C:
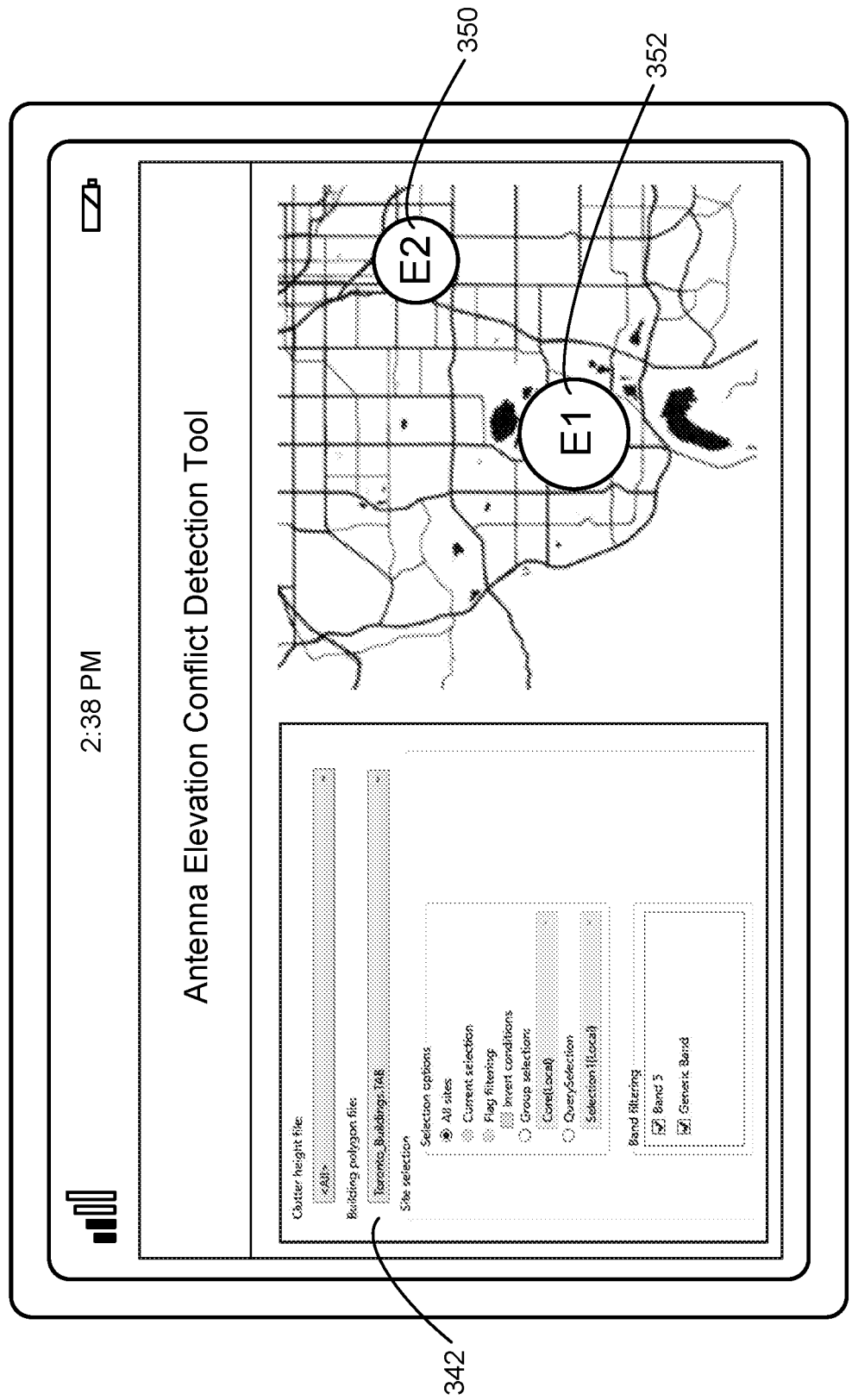
FIG. 3C depicts another embodiment of a mobile device providing a user interface for interacting with an RF planning automation system to detect and display antenna elevation conflicts.

FIG. 3C depicts another embodiment of the mobile device 302 providing a user interface for interacting with the RF planning automation system 160 to detect and display antenna elevation conflicts. In one example, the mobile device 302 may correspond with the computing device 154 in FIG. 1. The mobile device 302 may include a touchscreen display that displays a user interface to an end user of the mobile device 302. The mobile device 302 may display device status information regarding wireless signal strength, time, and battery life associated with the mobile device, as well as the user interface for controlling or interacting with the RF planning automation system 160. The user interface may be provided via a web-browser or an application running on the mobile device. The user interface may include one or more input fields 342 for submitting one or more input parameters to the RF planning automation system 160. The one or more input parameters may include a clutter height file that includes clutter data for different clutter areas within a region (e.g., a 10 kilometer by 10 kilometer region may be partitioned into 50 meter by 50 meter clutter areas and each of the clutter areas may correspond with a clutter height and a clutter density). In some cases, the clutter height file may include clutter data associated with the ground level elevation and the height of trees and other vegetation relative to the ground level elevation for each clutter area within a region. The one or more input parameters may also include a building polygon file that includes clutter data for buildings and other man-made structures within the region.

In some cases, clutter data from the building polygon file may be combined with clutter data from the clutter height file in order to generate a clutter map in which a region is partitioned into a plurality of clutter areas (e.g., 10 meter by 10 meter clutter areas) and each clutter area of the plurality of clutter areas is assigned a clutter density and a clutter height. The clutter height assigned to a clutter area may be determined based on the cluster density. In one example, if more than 70% of a clutter area is above a height threshold, then the clutter height for the clutter area may be set to the maximum height of the clutter within the clutter area. In another example, if less than 50% of a clutter area is below a height threshold, then the clutter height for the clutter area may be set to the average height of the clutter within the clutter area. In another example, if a clutter density for the clutter area is greater than a threshold density (e.g., is greater than 70%), then the clutter height for the clutter area may be set to the maximum height of the clutter within the clutter area. In another example, if a clutter density for the clutter area is less than the threshold density (e.g., is less than 50%), then the clutter height for the clutter area may be set to the average height of the clutter within the clutter area. In some cases, if the clutter density of a clutter area is below a threshold density, then the clutter within the clutter area may degrade or attenuate wireless signals to a lesser degree than if the clutter density of the clutter area was above the threshold density.

The one or more input parameters also include the ability to select particular frequency bands (e.g., radio frequencies near 850 MHz, such as radio frequencies between 840 MHz and 860 MHz). The coverage area of a cell site may be a function of the wireless frequencies transmitted. In one example, wireless transmissions at 2.4 GHz may support a larger coverage area than wireless transmissions at 5 GHz. Each of the particular frequency bands may correspond with a coverage area with a radial distance from the cell site.

As depicted in FIG. 3C, it has been detected that a first cell site E1 352 with a first coverage area has an elevation conflict due to clutter within the first coverage area having a clutter height that is higher than the height of the first cell site E1 352 or that is higher than the transmitting antenna of the first cell site E1 352. It has also been detected that a second cell site E2 350 with a second coverage area less than the first coverage area has an elevation conflict due to clutter within the second coverage area having a clutter height that is higher than the height of the second cell site E2 350 or that is higher than the transmitting antenna of the second cell site E2 350.

In some embodiments, an elevation conflict due to clutter being higher than a transmitting antenna may be detected if the clutter height of the clutter is within a threshold distance of the transmitting antenna. The threshold distance may be less than or equal to the radial distance of the coverage area for the transmitting antenna.

In some cases, each elevation conflict within a region may be ranked based on a difference between the clutter height within the threshold distance of the transmitting antenna and the height of the transmitting antenna. For example, the highest ranking elevation conflict may correspond with the greatest difference between the clutter height within the threshold distance of the transmitting antenna and the height of the transmitting antenna.

Figure 4A:
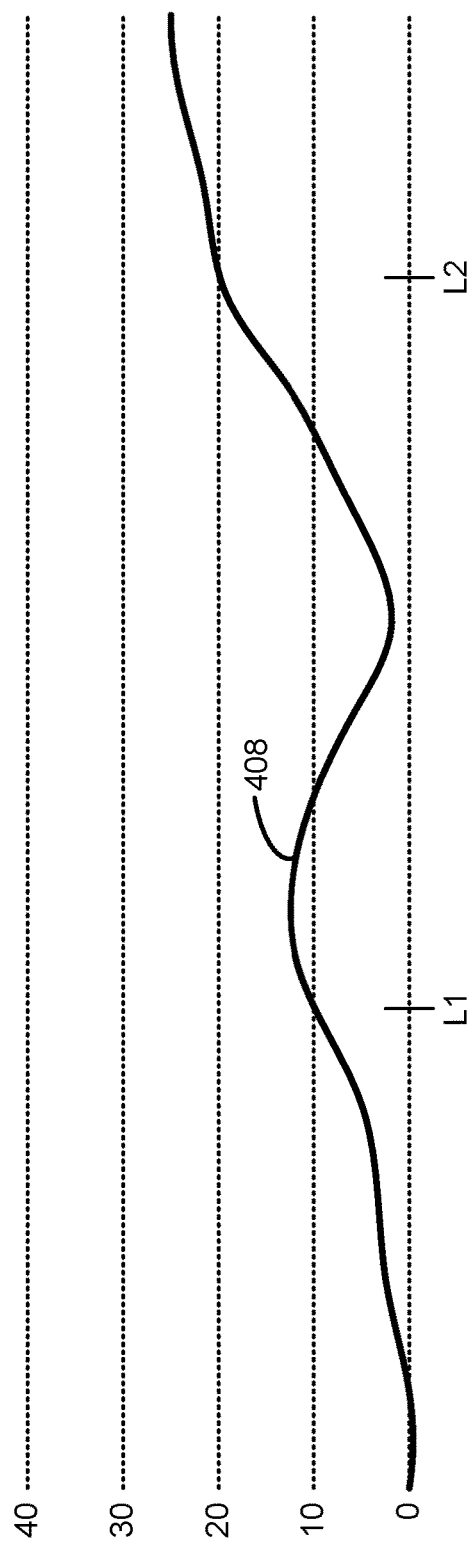
FIG. 4A depicts one embodiment of a cross-section of a terrain elevation map that includes ground elevation information.

FIG. 4A depicts one embodiment of a cross-section of a terrain elevation map that includes ground elevation information 408. The terrain elevation map may map ground elevation levels to different locations within a region. For example, at location L1 the ground elevation level has been assigned to 10 m above mean sea level and at location L2 the ground elevation level has been assigned to 20 m above mean sea level. The region may be partitioned into bins, wherein each bin is associated with a two-dimensional area (e.g., a 10 m by 10 m area) and each bin may be assigned a ground elevation level relative to mean sea level.

Figure 4B:
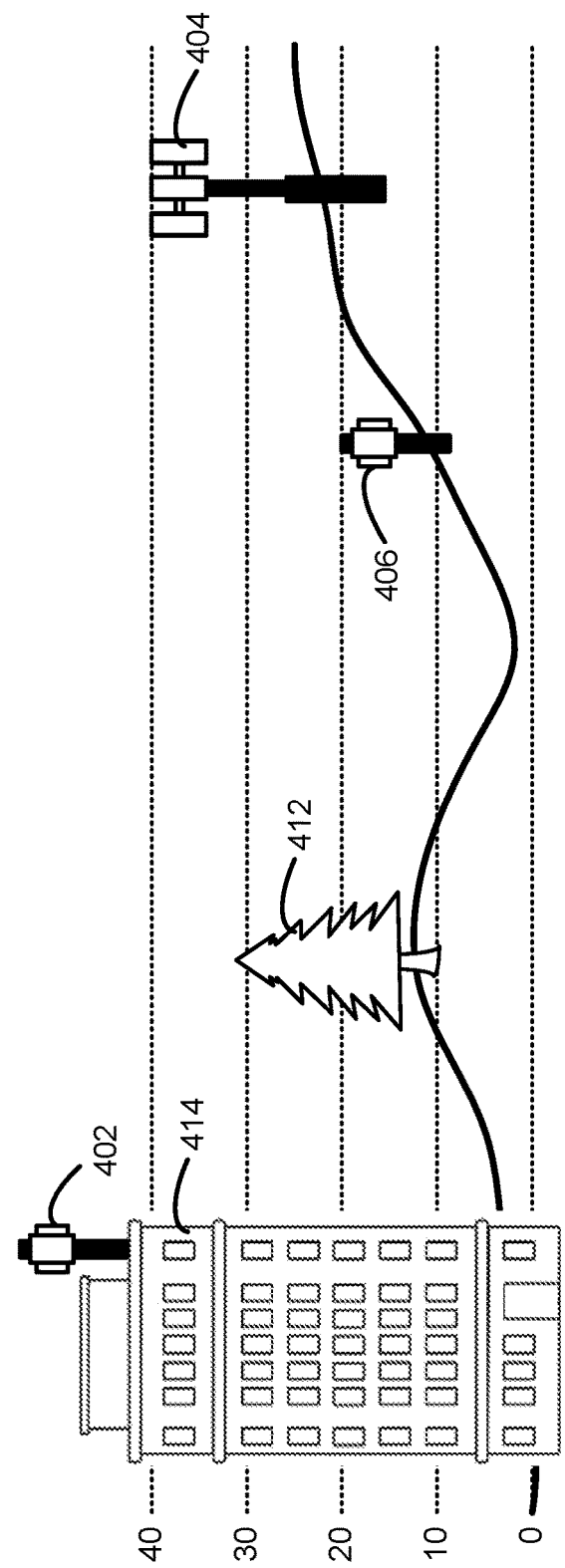
FIG. 4B depicts one embodiment of clutter data associated with buildings and trees and cell site data associated with cell sites within a region.

FIG. 4B depicts one embodiment of clutter data associated with buildings and trees and cell site data associated with cell sites within a region. The clutter data may include clutter heights and clutter density for clutter such as building 414 and tree 412. The cell site data may include antenna heights for cell sites 402, 404, and 406. The cell site data may also include a radial distance associated with a coverage area of a cell site. As depicted in FIG. 4B, the antenna height of the cell site 406 is lower than the clutter height for tree 412. The antenna height of the cell site 404 is higher than the clutter height for tree 412 but is lower than the clutter height for the building 414. The antenna height of the cell site 402 is higher than the clutter height for tree 412 and the clutter height for the building 414.

The antenna height of the cell site 404 may be determined by adding the height of the cell site 404 to the ground elevation of the ground at the location of the cell site 404. Similarly, the clutter height for tree 412 may be determined by adding the clutter height of the tree 412 to the ground elevation of the ground at the location of the tree 412.

Figure 4C:
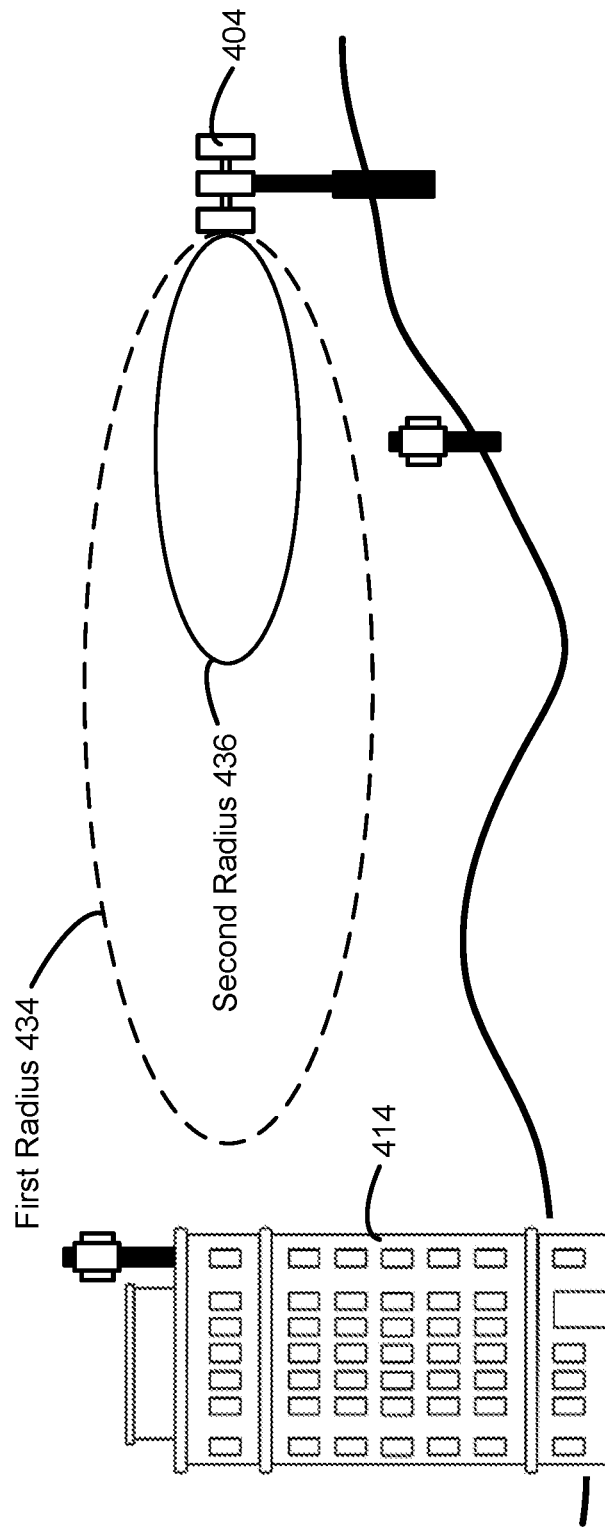
FIG. 4C depicts one embodiment of two different coverage areas for a cell site.

FIG. 4C depicts one embodiment of two different coverage areas for the cell site 404. As depicted, the cell site has a first coverage area with a first radius 434 when the cell site 404 is transmitting frequencies within a first range and a second coverage area with a second radius 436 less than the first radius 434 when the cell site 404 is transmitting frequencies within a second range. In one example, the transmitting frequency for the first coverage area may correspond with a 800 MHz frequency and the transmitting frequency for the second coverage area may correspond with a 2100 MHz frequency. As depicted, although the clutter height of the building 414 is higher than the antenna height for the cell site 404, wireless transmissions within both the first coverage area with the first radius 434 and the second coverage area with the second radius 436 are not impacted by the building 414.

Figure 4D:
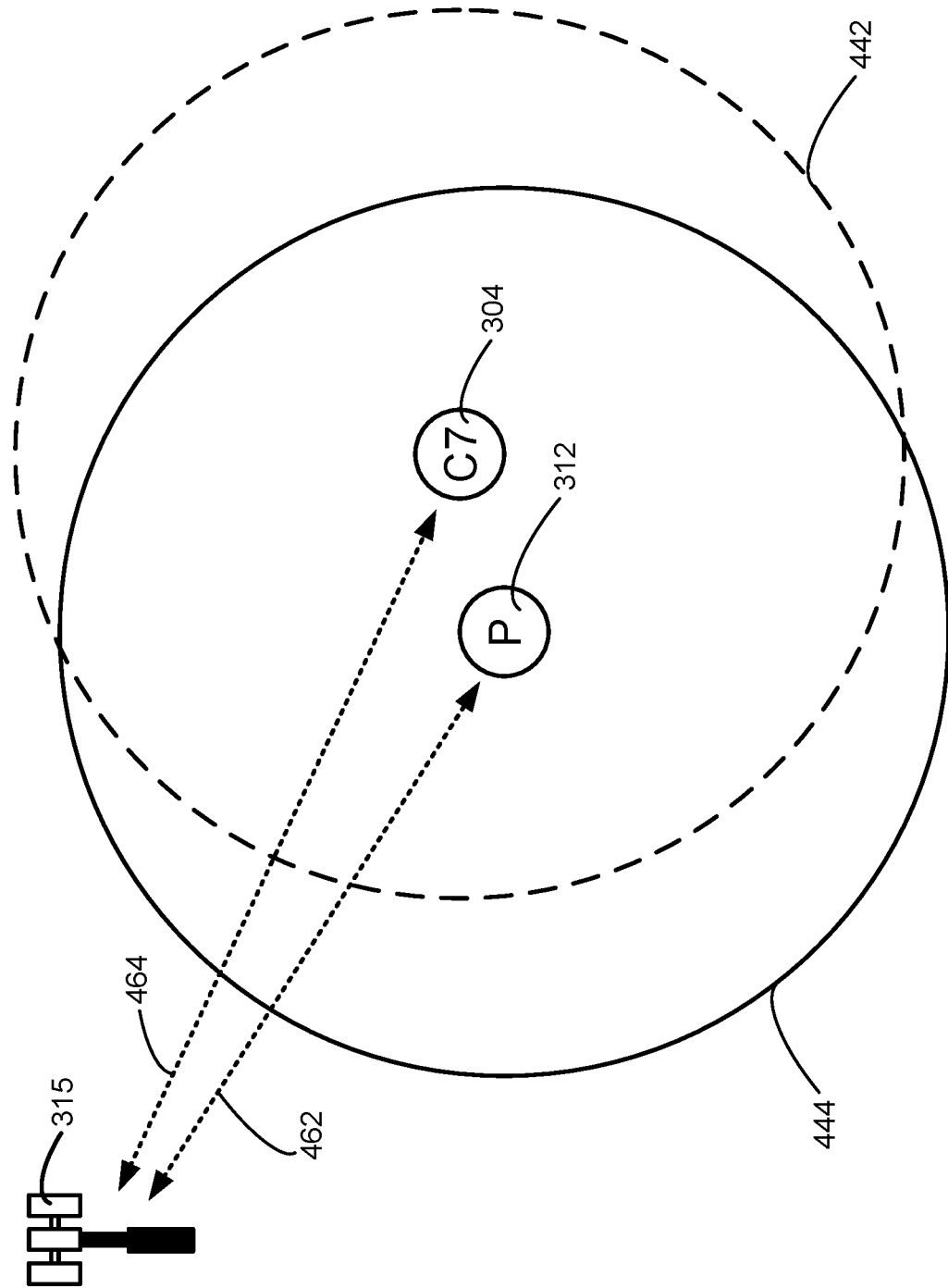
FIG. 4D depicts one embodiment of a primary cell site with a corresponding primary cell site coverage area and a backup candidate cell site with a corresponding backup site coverage area.

FIG. 4D depicts one embodiment of the primary cell site 312 with a corresponding primary cell site coverage area 444 and the backup candidate cell site C7 304 with a corresponding backup site coverage area 442. The overlap or intersection between the primary cell site coverage area 444 and the backup site coverage area 442 may comprise a coverage overlap area. The percentage of the coverage overlap area to the primary cell site coverage area 444 may comprise the percentage of the coverage area for the primary cell site 312 that can be supported by the backup candidate cell site C7 304. The hosted site 315 may comprise another primary cell site that is actively broadcasting wireless transmissions. The hosted site 315 may comprise a source of interference for signals wirelessly transmitted by the backup candidate cell site C7 304. Therefore, in some cases, the location of the backup candidate cell site C7 304 may need to maintain at least a minimum distance (e.g., at least 40 meters) between the backup candidate cell site C7 304 and the hosted site 315. In other cases, the backup candidate cell site C7 304 may be identified as a backup candidate cell site if the distance 464 between the backup candidate cell site C7 304 and the hosted site 315 is greater than or equal to the distance 462 between the primary cell site 312 and the hosted site 315.

Figure 5A:
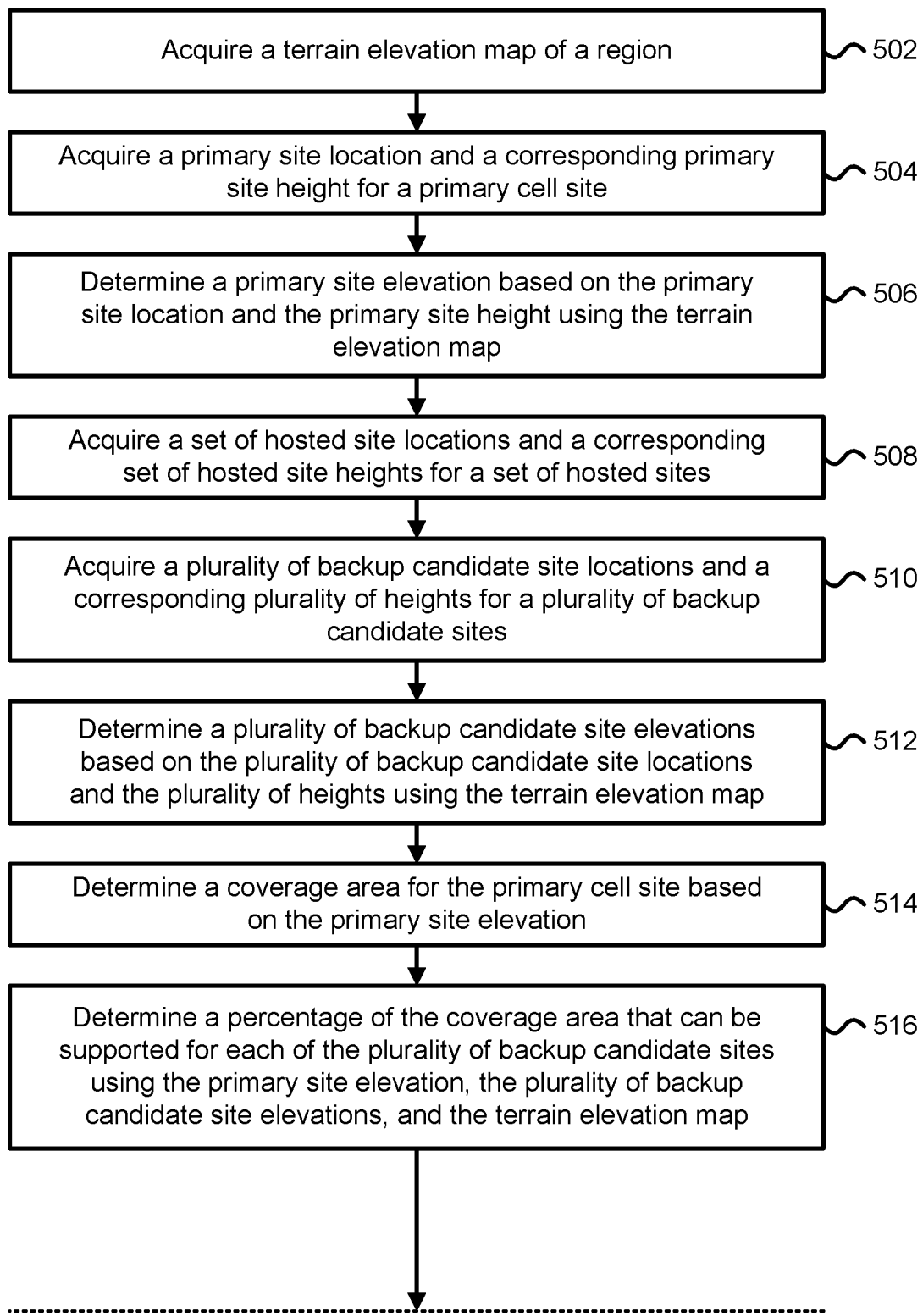
FIGS. 5A-5B depict a flowchart describing one embodiment of a process for ranking and identifying one or more backup candidate sites for a primary cell site.
Figure 5B:
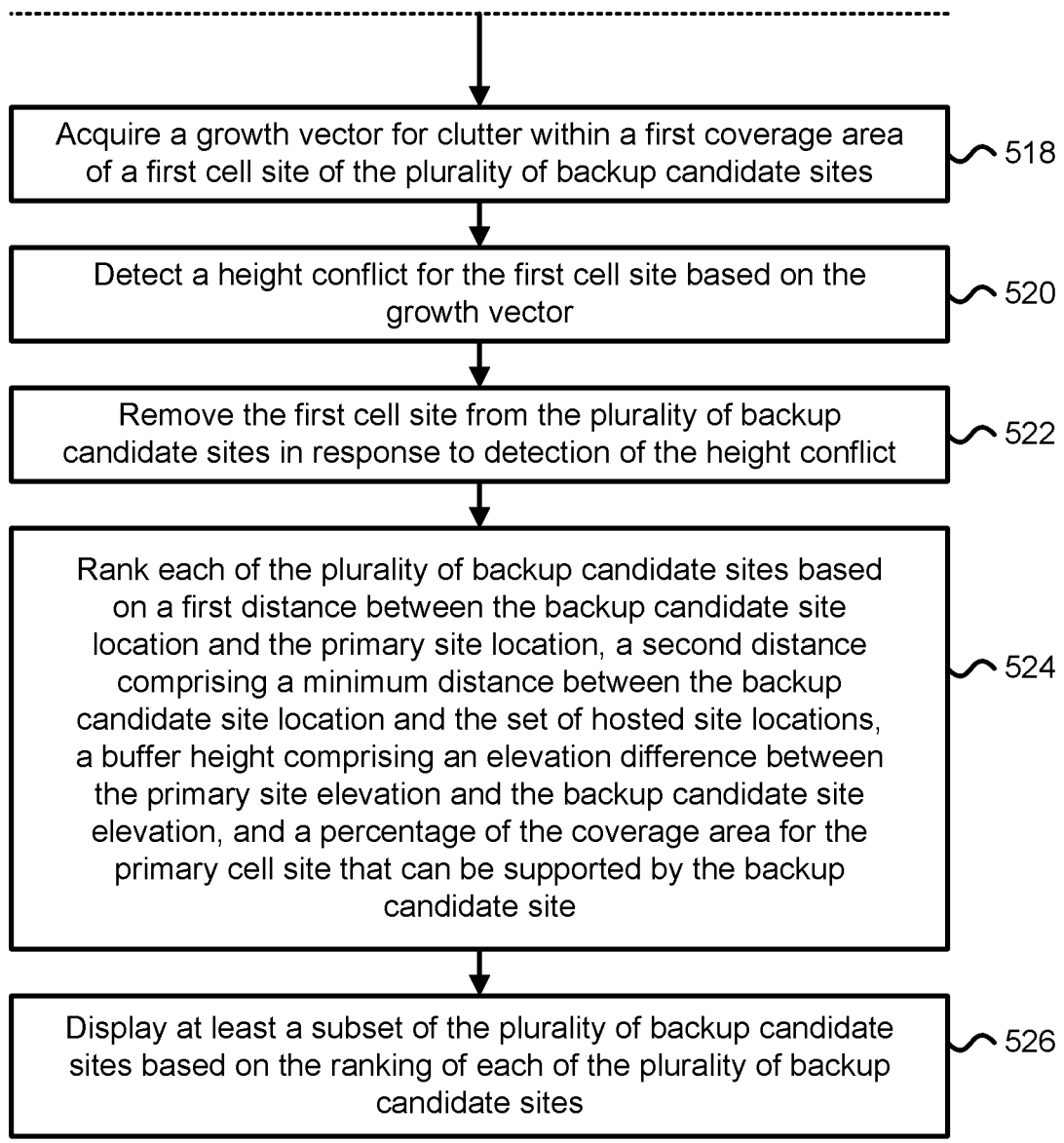

FIGS. 5A-5B depict a flowchart describing one embodiment of a process for ranking and identifying one or more backup candidate sites for a primary cell site. In one embodiment, the process of FIGS. 5A-5B may be performed using one or more real machines, one or more virtual machines, and/or one or more containerized applications. In another embodiment, the process of FIGS. 5A-5B or portions thereof may be performed using a containerized environment, such as the containerized environment 279 in FIG. 2C. In another embodiment, the process of FIGS. 5A-5B or portions thereof may be performed using an RF planning automation system, such as the RF planning automation system 160 in FIG. 1.

In step 502, a terrain elevation map of a region is acquired. The terrain elevation map may map ground elevation levels to different locations within the region. The region may be partitioned into subareas and the terrain elevation map may include ground elevation data relative to a ground reference, such as a ground distance above sea level, for each of the subareas. In step 504, a primary site location and a corresponding primary site height for a primary cell site is acquired. In one example, the primary cell site may correspond with the primary cell site 312 in FIG. 3B. In step 506, a primary site elevation is determined based on the primary site location and the primary site height using the terrain elevation map. In one example, the primary site elevation may be determined or computed using a ground height above sea level for the primary site location provided by the terrain elevation map and adding the primary site height to the ground height above sea level for the primary site location.

In step 508, a set of hosted site locations and a corresponding set of hosted site heights for a set of hosted sites is acquired. In one example, a first hosted site of the set of hosted sites may correspond with hosted cell site 315 in FIG. 3A. In step 510, a plurality of backup candidate site locations and a corresponding plurality of heights for a plurality of backup candidate sites is acquired. The plurality of backup candidate sites may be acquired from a map of available cell sites that are not currently being operated or are available for antenna installation. In one example, the plurality of backup candidate sites may include backup candidate sites C1-C7 in FIG. 3A. In step 512, a plurality of backup candidate site elevations is determined based on the plurality of backup candidate site locations and the plurality of heights using the terrain elevation map. In one example, a first backup candidate site elevation of the plurality of backup candidate site elevations may be determined or computed using a ground height above sea level for a first backup candidate site of the plurality of backup candidate sites provided by the terrain elevation map and adding a first height of the plurality of heights corresponding with the first backup candidate site to the ground height above sea level for the first backup candidate site.

In step 514, a coverage area for the primary cell site is determined based on the primary site elevation. The coverage area may be a function of the frequencies transmitted by the primary cell site and may comprise an area in which wireless devices may receive signals from the primary cell site. In one example, the coverage area for the primary cell site may correspond with the primary cell site coverage area 444 for the primary cell site 312 in FIG. 4D. In step 516, a percentage of the coverage area that can be supported for each of the plurality of backup candidate sites is determined using the primary site elevation, the plurality of backup candidate site elevations, and the terrain elevation map. In one example, for the primary cell site coverage area 444 in FIG. 4D, the percentage of the coverage area that can be supported by a first backup site of the plurality of backup candidate sites may correspond with the amount of overlap between the primary cell site coverage area 444 and the backup site coverage area 442 in FIG. 4D, wherein the backup site coverage area 442 comprises the first backup site.

In some embodiments, the coverage area for a first backup site of the plurality of backup candidate sites may be limited by the presence of clutter blockages within a radial distance of the first backup site. For example, if the first backup site would have a first coverage area with a first radius when transmitting frequencies within a first range and there exists a clutter blockage with a clutter height higher than an elevation of the first backup site that is within the first coverage area, then the effective coverage area for the first backup site may be reduced to have a radial distance equal to the distance between the first backup site and the location of the clutter blockage. In this case, the existence of the clutter blockage may shrink the effective coverage area for the first backup site.

In step 518, a growth vector for clutter within a first coverage area of a first cell site of the plurality of backup candidate sites is acquired. The growth vector may correspond with a yearly growth in a height of the clutter. In step 520, a height conflict for the first cell site is detected based on the growth vector. In one example, a five-year growth period (e.g., corresponding with a number of years in which the primary cell site is to be operational) may be used to estimate the height of the clutter in five years and the estimated height of the clutter in five years may be compared with an elevation of the first cell site; if the elevation of the first cell site corresponding with an elevation of a transmitting antenna of the first cell site is lower than the estimated height of the clutter and five years, then a height conflict for the first cell site may be detected.

In step 522, the first cell site is removed from the plurality of backup candidate sites in response to detection of the height conflict. In some embodiments, each backup site of the plurality of backup candidate sites may be removed from consideration if clutter height within their coverage areas will exceed an antenna elevation for the backup site within the next threshold number of years (e.g., within the next five years). In step 524, each of the plurality of backup candidate sites is scored and ranked based on a first distance between the backup candidate site location and the primary site location, a second distance comprising a minimum distance between the backup candidate site location and the set of hosted site locations, a buffer height comprising an elevation difference between the primary site elevation and the backup candidate site elevation, and/or a percentage of the coverage area for the primary cell site that can be supported by the backup candidate site.

In some cases, a subset of the plurality of backup candidate sites may be identified in which each backup candidate site of the subset comprises a backup candidate site that is more than the minimum distance away from any of the set of hosted sites and in which each backup candidate site of the subset has an elevation that is within the buffer height for the primary cell site. The subset of the plurality of backup candidate sites may then be scored and ranked based on a first distance between the backup candidate site and the primary cell site such that the closer the backup candidate site is to the primary cell site the higher the ranking. In step 526, at least a subset of the plurality of backup candidate sites is displayed or outputted based on the ranking of each of the plurality of backup candidate sites. In one example, a subset of the plurality of backup candidate sites is displayed based on the ranking of the plurality of backup candidate sites.

Figure 5C:
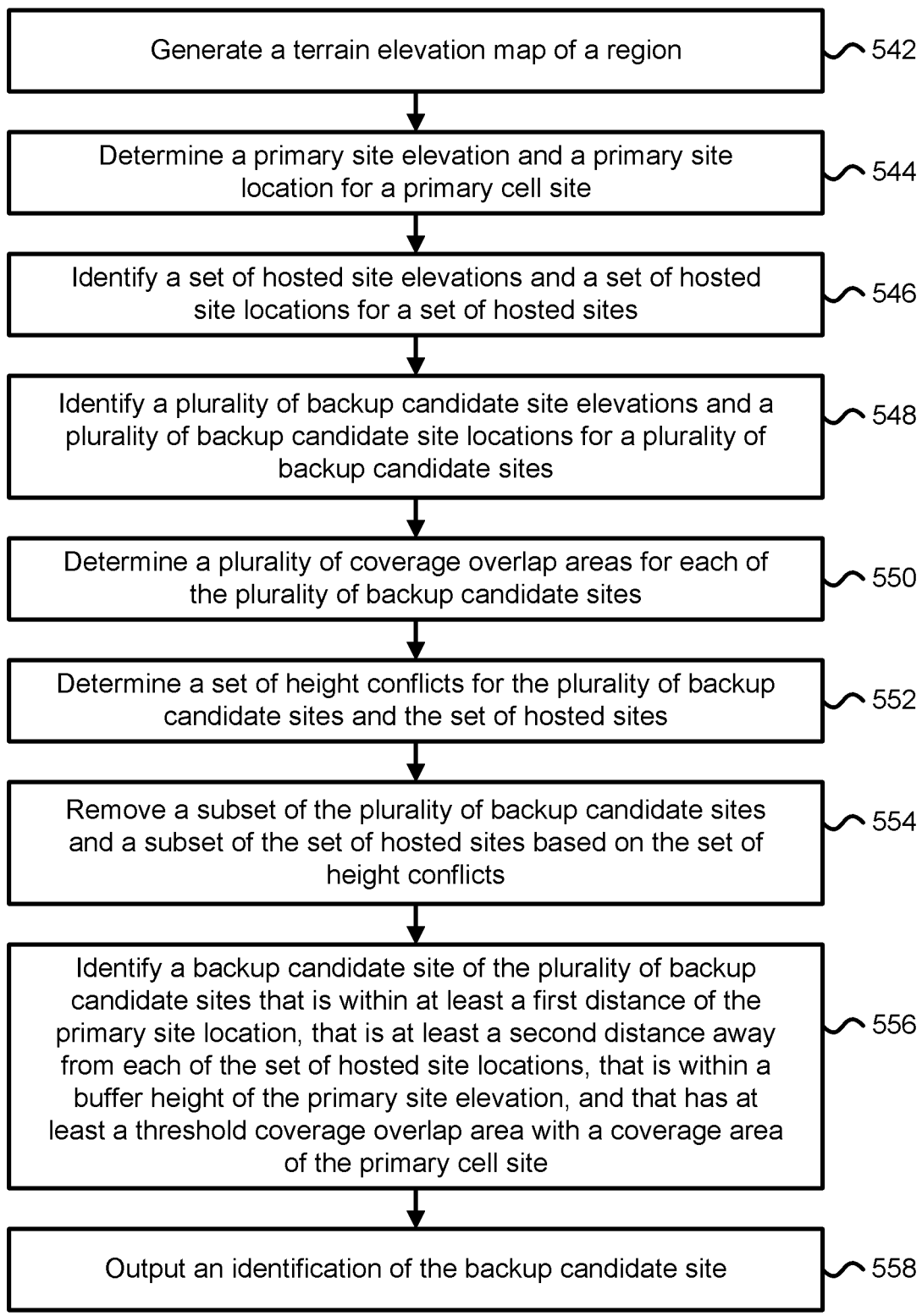
FIG. 5C depicts a flowchart describing an embodiment of a process for ranking and identifying one or more backup candidate sites for a primary cell site.

FIG. 5C depicts a flowchart describing an embodiment of a process for ranking and identifying one or more backup candidate sites for a primary cell site. In one embodiment, the process of FIG. 5C may be performed using one or more real or virtual machines and/or one or more containerized applications. In another embodiment, the process of FIG. 5C or portions thereof may be performed using a containerized environment, such as the containerized environment 279 in FIG. 2C. In another embodiment, the process of FIG. 5C or portions thereof may be performed using an RF planning automation system, such as the RF planning automation system 160 in FIG. 1.

In step 542, a terrain elevation map of a region is generated. In one embodiment, the terrain elevation map may be generated by acquiring terrain elevation data of the region and averaging conflicting elevation data points to generate the terrain elevation map. In another embodiment, the terrain elevation map may be generated by acquiring terrain elevation data of the region and generating the terrain elevation map using the maximum elevations when elevation data points conflict at a coordinate location within the region. In step 544, a primary site elevation and a primary site location for a primary cell site are determined. In step 546, a set of hosted site elevations and a set of hosted site locations for a set of hosted sites is identified. The set of hosted sites may comprise a set of other primary cell sites that are wirelessly transmitting signals. In step 548, a plurality of backup candidate site elevations and a plurality of backup candidate site locations for a plurality of backup candidate sites is identified. In step 550, a plurality of coverage overlap areas for each of the plurality of backup candidate sites is determined. In step 552, a set of height conflicts for the plurality of backup candidate sites and the set of hosted sites is determined. The set of height conflicts may correspond with transmitting antenna heights falling below clutter heights for clutter within coverage areas of the plurality of backup candidate sites and/or the set of hosted sites. One example of a process for detecting height conflicts is described in reference to FIG. 6. In step 554, a subset of the plurality of backup candidate sites and/or a subset of the set of hosted sites is/are removed based on the set of height conflicts.

In step 556, a backup candidate site of the plurality of backup candidate sites is identified. The backup candidate site may be identified if it is within at least a first distance of the primary site location, is at least a second distance away from each of the set of hosted site locations, is within a buffer height of the primary site elevation, and has at least a threshold coverage overlap with a coverage area of the primary cell site. In one embodiment, the backup candidate site of the plurality of backup candidate sites may be identified as the closest backup candidate site to the primary cell site that is more than the second distance away from each of the set of hosted site locations and has at least the threshold coverage overlap with the coverage area of the primary cell site. In another embodiment, the backup candidate site of the plurality of backup candidate sites may be identified as the closest backup candidate site to the primary cell site that is within the buffer height of the primary site elevation and has at least the threshold coverage overlap with the coverage area of the primary cell site. In step 558, an identification of the backup candidate site is outputted. In one example, the identification of the backup candidate site is displayed using a mobile computing device, such as the mobile device 302 in FIG. 3B.

Figure 6A:
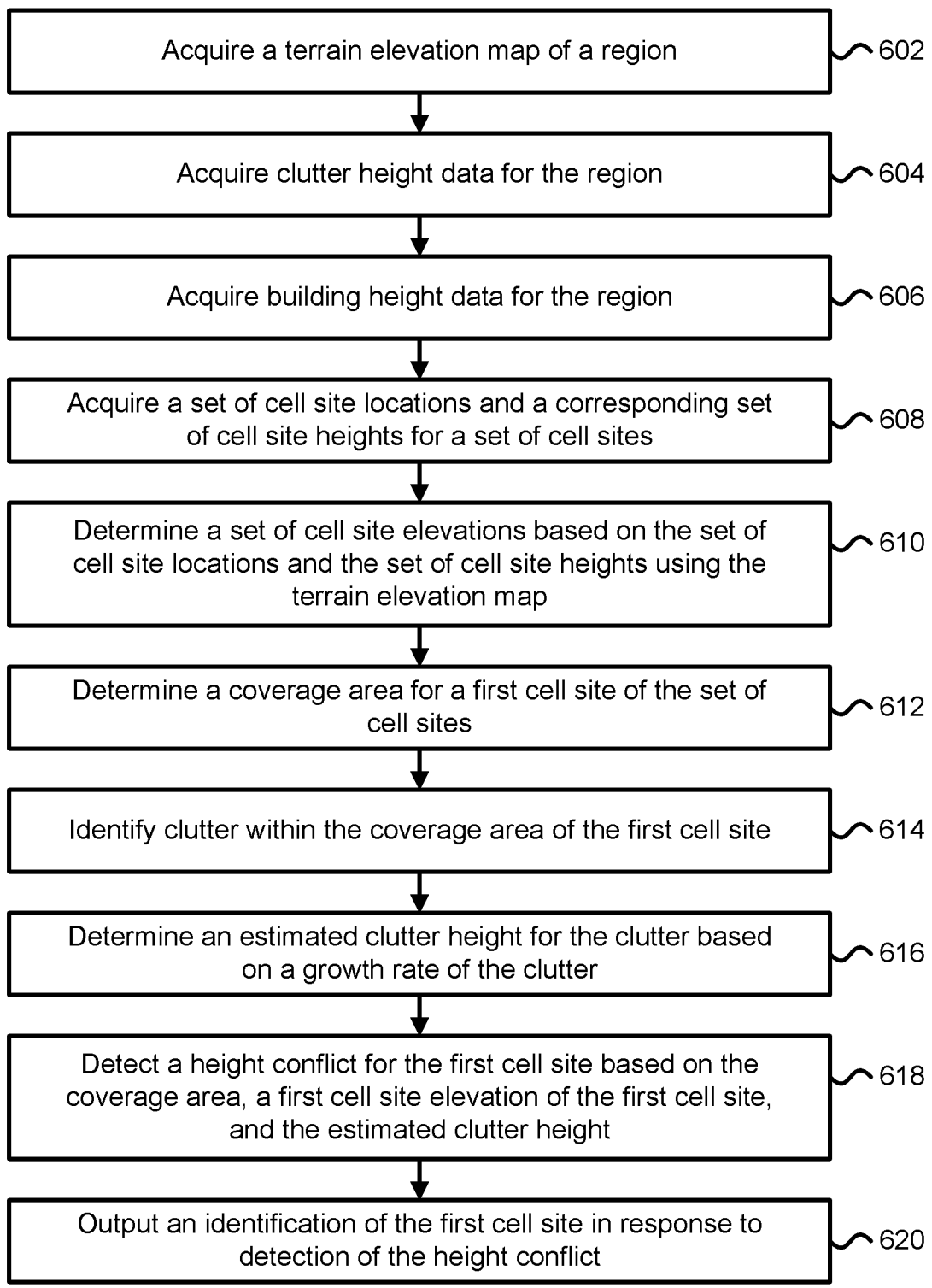
FIG. 6A depicts a flowchart describing an embodiment of a process for detecting height conflicts.

FIG. 6A depicts a flowchart describing an embodiment of a process for detecting height conflicts. A height conflict may occur when a transmitting antenna for a cell site has a lower elevation than clutter within a coverage area of the transmitting antenna. In one embodiment, the process of FIG. 6A may be performed using one or more real or virtual machines and/or one or more containerized applications. In another embodiment, the process of FIG. 6A or portions thereof may be performed using a containerized environment, such as the containerized environment 279 in FIG. 2C. In another embodiment, the process of FIG. 6A or portions thereof may be performed using an RF planning automation system, such as the RF planning automation system 160 in FIG. 1.

In step 602, a terrain elevation map of a region is acquired. In step 604, clutter height data for the region is acquired. In step 606, building height data for the region is acquired. The clutter height data and the building height data may be used to determine elevations of clutter within the region. In one example, the region may be partitioned into subareas and each subarea may be assigned a clutter elevation based on the clutter height data and the building height data. In step 608, a set of cell site locations and a corresponding set of cell site heights for a set of cell sites is acquired. In step 610, a set of cell site elevations is determined based on the set of cell site locations and the set of cell site heights using the terrain elevation map. The set of cell site elevations may correspond with elevations of transmitting antennas for the cell sites within the set of cell sites relative to mean sea level.

In step 612, a coverage area for a first cell site of the set of cell sites is determined. The coverage area for the first cell site may be determined based on a transmitting frequency (or a range of frequencies) of wireless signals transmitted by the first cell site. In step 614, clutter within the coverage area of the first cell site is identified. In step 616, an estimated clutter height for the clutter is determined based on a growth rate of the clutter. In some cases, a growth vector for the clutter may be acquired. The growth vector may be associated with an estimated yearly growth rate for the clutter. In step 618, a height conflict for the first cell site is detected based on the coverage area, a first cell site elevation of the first cell site, and the estimated clutter height. The estimated clutter height may be determined by computing a current clutter height using the clutter height data and the building height data and the extrapolating a future clutter height based on the growth rate of the clutter. In step 620, an identification of the first cell site is outputted in response to detection of the height conflict.

Figure 6B:
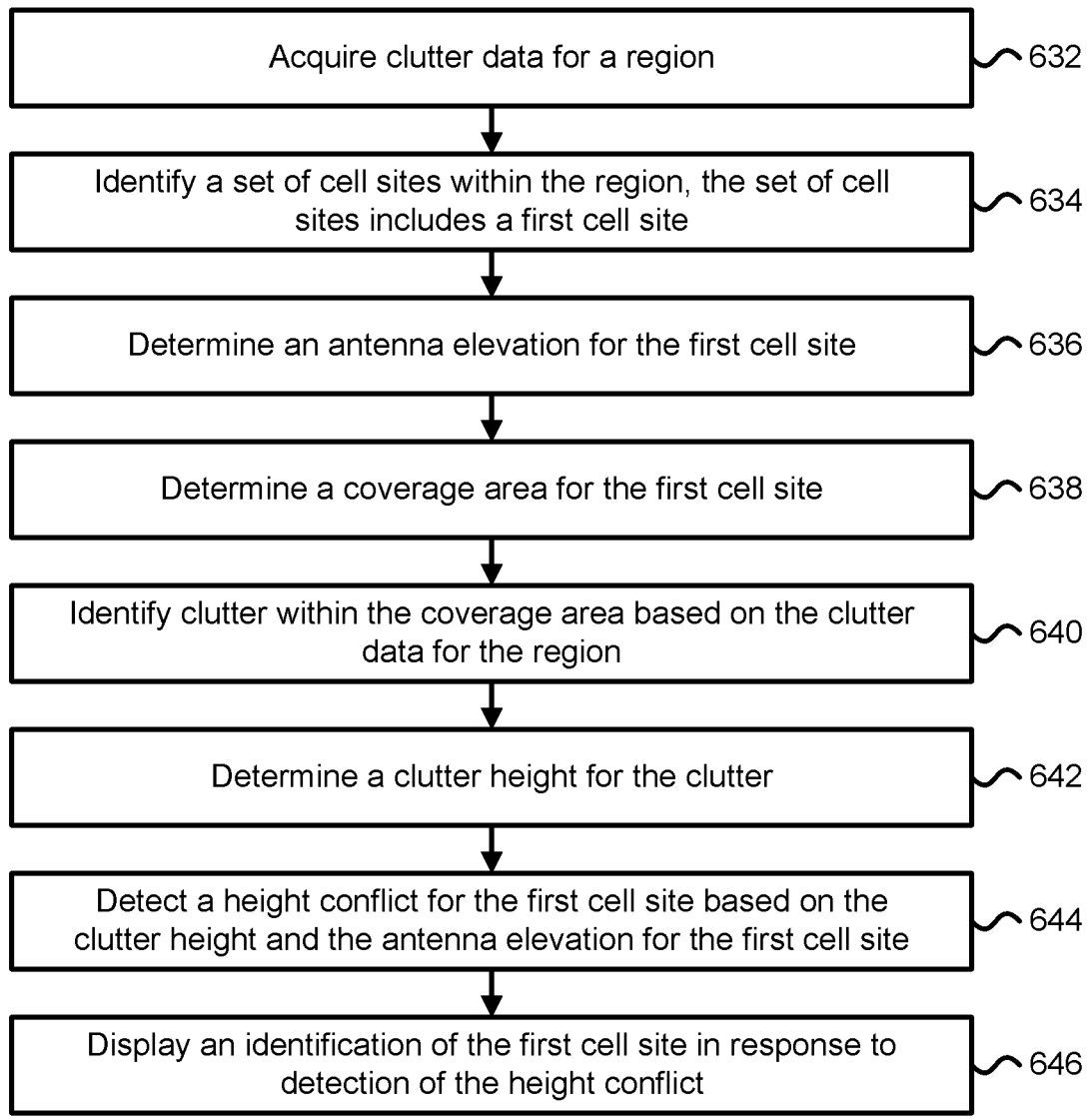
FIG. 6B depicts a flowchart describing an embodiment of a process for detecting height conflicts.

FIG. 6B depicts a flowchart describing an embodiment of a process for detecting height conflicts. A height conflict may occur when a transmitting antenna for a cell site has a lower elevation than clutter within a coverage area of the transmitting antenna. In one embodiment, the process of FIG. 6B may be performed using one or more real machines, one or more virtual machines, and/or one or more containerized applications. In another embodiment, the process of FIG. 6B or portions thereof may be performed using a containerized environment, such as the containerized environment 279 in FIG. 2C. In another embodiment, the process of FIG. 6B or portions thereof may be performed using an RF planning automation system, such as the RF planning automation system 160 in FIG. 1.

In step 632, clutter data for a region is acquired. The clutter data may include clutter height data and clutter density data for a plurality of subareas within the region. In step 634, a set of cell sites within the region is identified. The set of cell sites includes a first cell site. In one example, the first cell site may correspond with a macrocell tower structure. In another example, the first cell site may correspond with a small cell structure. In step 636, an antenna elevation for the first cell site is determined. The antenna elevation for the first cell site may be determined by adding and antenna height for the first cell site to a ground elevation for the first cell site. In step 638, a coverage area for the first cell site is determined. In one example, the coverage area may be determined based on one or more transmitting frequencies used by the first cell site. In step 640, clutter within the coverage area is identified based on the clutter data for the region. The clutter may comprise trees or buildings within the region. In step 642, a clutter height for the clutter is determined. In some cases, the clutter height for the clutter may be determined based on a clutter density associated with the clutter. In one example, if the clutter density is above a threshold density (e.g., is greater than 70%), then the clutter height for the clutter may be set to a maximum clutter height within a clutter area for the clutter. In step 644, a height conflict for the first cell site is detected based on the clutter height and the antenna elevation for the first cell site. The height conflict may be detected if the antenna elevation for the first cell site is below the clutter height. In step 646, an identification of the first cell site is displayed or outputted in response to detection of the height conflict.

At least one embodiment of the disclosed technology includes one or more processors configured to identify a primary cell site, a set of hosted sites, and a plurality of backup candidate sites within a region. The one or more processors are configured to determine a plurality of coverage overlap areas with the primary cell site for each backup candidate site of the plurality of backup candidate sites, and rank each backup candidate site of the plurality of backup candidate sites based on a distance between the backup candidate site and the primary cell site, a minimum distance between the backup candidate site and each of the set of hosted sites, and a coverage overlap area of the plurality of coverage overlap areas for the backup candidate site. The one or more processors are configured to cause a subset of the plurality of backup candidate sites to be displayed based on the ranking of the plurality of backup candidate sites.

At least one embodiment of the disclosed technology includes identifying a primary cell site, a set of hosted sites, and a plurality of backup candidate sites within a region. The method further comprises determining a plurality of coverage overlap areas with the primary cell site for each backup candidate site of the plurality of backup candidate sites based on one or more transmitting frequencies for the primary cell site and ranking each backup candidate site of the plurality of backup candidate sites based on a distance between the backup candidate site and the primary cell site, a minimum distance between the backup candidate site and each of the set of hosted sites, and a coverage overlap area of the plurality of coverage overlap areas for the backup candidate site. The method further comprises displaying at least a subset of the plurality of backup candidate sites based on the ranking of the plurality of backup candidate sites.

In some cases, the method further comprises detecting a height conflict for a first hosted site of the set of hosted sites with environmental clutter within the region and removing the first hosted site from the set of hosted sites in response to detecting that the first hosted site has the height conflict with the environmental clutter within the region prior to ranking each backup candidate site of the plurality of backup candidate sites.

At least one embodiment of the disclosed technology includes one or more processors configured to acquire clutter data for a region. The clutter data includes a clutter density corresponding with a clutter area. The one or more processors configured to identify a set of cell sites within the region. The set of cell sites includes a first cell site. The one or more processors configured to determine an antenna elevation for the first cell site, determine a transmitting frequency for the first cell site, determine a coverage area for the first cell site based on the antenna elevation for the first cell site and the transmitting frequency for the first cell site, and identify clutter within the coverage area of the first cell site based on the clutter data for the region. The clutter is located within the clutter area. The one or more processors configured to determine a clutter height for the clutter based on the clutter density, detect a height conflict for the first cell site based on the clutter height and the antenna elevation for the first cell site, and display an identification of the first cell site in response to detection of the height conflict.

In some cases, the one or more processors are configured to determine a clutter density for the clutter, detect that the clutter density is above a threshold density, and set the clutter height for the clutter to a maximum clutter height within a clutter area in response to detection that the clutter density is above the threshold density.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
one or more processors configured to:
  acquire clutter data for a region;
  identify a set of cell sites within the region, the set of cell sites including a first cell site;
  determine an antenna elevation for the first cell site;
  determine a coverage area for the first cell site;
  identify clutter within the coverage area of the first cell site based on the clutter data for the region;
  determine a clutter density for the clutter;
  determine a clutter height for the clutter based on the clutter density;
  detect a height conflict for the first cell site based on the clutter height and the antenna elevation for the first cell site; and
  display an identification of the first cell site in response to detection of the height conflict.

2. The system of claim 1, wherein the one or more processors determine the clutter height for the clutter by being configured to detect that the clutter density is above a threshold density, and set the clutter height for the clutter to a maximum clutter height within a clutter area in response to detection that the clutter density is above the threshold density.

3. The system of claim 1, wherein the one or more processors determine the clutter density for the clutter by being configured to identify a clutter area for the clutter within the region and determine the clutter density for the clutter area.

4. The system of claim 1, wherein the one or more processors are configured to determine an estimated clutter height for the clutter based on a growth rate of the clutter and detect the height conflict for the first cell site based on the estimated clutter height.

5. The system of claim 4, wherein the one or more processors are configured to acquire a growth vector for the clutter and set the estimated clutter height based on the growth vector.

6. The system of claim 1, wherein the clutter comprises vegetation within the region.

7. The system of claim 1, wherein the clutter data includes clutter height data and building height data.

8. The system of claim 1, wherein the one or more processors are configured to acquire terrain elevation data for the region and determine the antenna elevation for the first cell site based on the terrain elevation data.

9. The system of claim 1, wherein the one or more processors are configured to determine the coverage area for the first cell site based on the antenna elevation of the first cell site.

10. The system of claim 1, wherein the one or more processors are configured to determine the coverage area for the first cell site based on one or more transmitting frequencies used by the first cell site.

11. A method, comprising:
acquiring clutter data for a region;
identifying a set of cell sites within the region, the set of cell sites includes a first cell site;
determining an antenna elevation for the first cell site;
determining a coverage area for the first cell site based on the antenna elevation for the first cell site;
identifying clutter within the coverage area of the first cell site based on the clutter data for the region;
determining a clutter density for the clutter;
determining a clutter height for the clutter based on the clutter density;
detecting a height conflict for the first cell site based on the clutter height and the antenna elevation for the first cell site; and
displaying an identification of the first cell site in response to detection of the height conflict.

12. The method of claim 11, wherein determining the clutter height for the clutter comprises:
detecting that the clutter density is above a threshold density; and
setting the clutter height for the clutter to a maximum clutter height within a clutter area in response to detecting that the clutter density is above the threshold density.

13. The method of claim 11, wherein determining the clutter density for the clutter comprises:
identifying a clutter area for the clutter within the region; and
determining a clutter density for the clutter area.

14. The method of claim 11, further comprising:
  determining an estimated clutter height for the clutter based on a growth rate of the clutter; and
  detecting the height conflict for the first cell site based on the estimated clutter height.

15. The method of claim 11, wherein the clutter comprises a building within the region.

16. The method of claim 11, wherein the clutter comprises one or more trees within the region.

17. The method of claim 11, wherein the determining the coverage area for the first cell site includes determining the coverage area for the first cell site based on a transmitting frequency used by the first cell site.

18. One or more storage devices containing processor readable code for configuring one or more processors to perform a method, wherein the processor readable code configures the one or more processors to:
  acquire clutter data for a region, the clutter data includes a clutter density corresponding with a clutter area;
  identify a set of cell sites within the region, the set of cell sites including a first cell site;
  determine an antenna elevation for the first cell site;
  determine a transmitting frequency for the first cell site;
  determine a coverage area for the first cell site based on the antenna elevation for the first cell site and the transmitting frequency for the first cell site;
  identify clutter within the coverage area of the first cell site based on the clutter data for the region, the clutter is located within the clutter area;
  determine a clutter height for the clutter based on the clutter density;
  detect a height conflict for the first cell site based on the clutter height and the antenna elevation for the first cell site; and
  display an identification of the first cell site in response to detection of the height conflict.

* * * * *